(12) United States Patent
Kumaki et al.

(10) Patent No.: US 7,668,234 B2
(45) Date of Patent: Feb. 23, 2010

(54) TEST SIGNAL GENERATING APPARATUS FOR COMMUNICATIONS EQUIPMENT AND TEST SIGNAL GENERATING METHOD FOR COMMUNICATIONS EQUIPMENT

(75) Inventors: Akihisa Kumaki, Atsugi (JP); Ikuya Otani, Atsugi (JP); Norihiro Akiyama, Atsugi (JP)

(73) Assignee: Anritsu Corp., Atsugi-Shi (JP)

( * ) Notice: Subject to any disclaimer, the term of this patent is extended or adjusted under 35 U.S.C. 154(b) by 548 days.

(21) Appl. No.: 11/579,644

(22) PCT Filed: Apr. 6, 2006

(86) PCT No.: PCT/JP2006/007355

§ 371 (c)(1),
(2), (4) Date: Nov. 6, 2006

(87) PCT Pub. No.: WO2006/134713

PCT Pub. Date: Dec. 21, 2006

(65) Prior Publication Data

US 2008/0291987 A1 Nov. 27, 2008

(30) Foreign Application Priority Data

Jun. 14, 2005 (JP) .............................. 2005-173877

(51) Int. Cl.
*H04B 3/46* (2006.01)

(52) U.S. Cl. ..................................................... 375/224

(58) Field of Classification Search ................. 375/224, 375/225, 226, 227, 228; 324/513, 523, 527, 324/528, 750, 755, 763, 765; 370/247, 251; 379/21, 26.02, 27.04; 700/39, 81; 702/120, 702/121; 714/30, 36, 715, 734, 738
See application file for complete search history.

(56) References Cited

U.S. PATENT DOCUMENTS

| 5,719,857 | A | | 2/1998 | Heikkinen | |
|---|---|---|---|---|---|
| 6,061,394 | A | * | 5/2000 | Itahara | 375/227 |
| 6,122,313 | A | * | 9/2000 | Peterson et al. | 375/224 |
| 7,185,244 | B2 | * | 2/2007 | Kojima et al. | 714/718 |
| 7,363,563 | B1 | * | 4/2008 | Hissen et al. | 714/733 |
| 2004/0225459 | A1 | * | 11/2004 | Krishnaswamy et al. | 702/57 |
| 2004/0266423 | A1 | | 12/2004 | Morikawa et al. | |

FOREIGN PATENT DOCUMENTS

| JP | 7-273555 A | 10/1995 |
|---|---|---|
| JP | 08-510627 A | 11/1996 |
| JP | 11-186941 A | 7/1999 |

(Continued)

OTHER PUBLICATIONS

Notification Concerning Transmittal of International Preliminary Report on Patentability, Chapter I of the Patent Cooperation Treaty for PCT/JP2006/307355, and Written Opinion, 5 sheets, 2007.

*Primary Examiner*—Sam K Ahn
(74) *Attorney, Agent, or Firm*—Frishauf, Holtz, Goodman & Chick, P.C.

(57) ABSTRACT

A test signal generating apparatus for communications equipment sequentially uses first and second sequence information which are stored in a sequence memory for storing the first sequence information including a reading order and read addresses of unit data including I and Q waveform data, and desired signal levels to be set to the unit data, and the second sequence information including frequency offsets. Consequently, the test signal generating apparatus provides frequency offsets at a plurality of steps every predetermined frequency intervals by using a predetermined carrier frequency as a reference, with respect to the I and Q waveform data at a digital stage up to digital-to-analog converters, and outputs a test signal in the frequency hopping system.

26 Claims, 9 Drawing Sheets

FOREIGN PATENT DOCUMENTS

| | | |
|---|---|---|
| JP | 2002-246992 A | 8/2002 |
| JP | 2004-336594 A | 11/2004 |
| JP | 2005-12274 A | 1/2005 |
| JP | 2005-294984 A | 10/2005 |

\* cited by examiner

| Reading numbers | Waveform types | Read starting addresses | Read ending addresses | Level offset values | Offset frequencies ω' |
|---|---|---|---|---|---|
| 1 | A | $AD_{1S}$ | $AD_{1E}$ | 0dB(0) | +0Hz |
| 2 | A | $AD_{1S}$ | $AD_{1E}$ | +2dB(0) | 1MHz |
| 3 | A | $AD_{1S}$ | $AD_{1E}$ | +5dB(0) | −2MHz |
| 4 | A | $AD_{1S}$ | $AD_{1E}$ | +5dB(0) | +2MHz |
| 5 | A | $AD_{1S}$ | $AD_{1E}$ | +2dB(0) | −1MHz |
FIG. 2
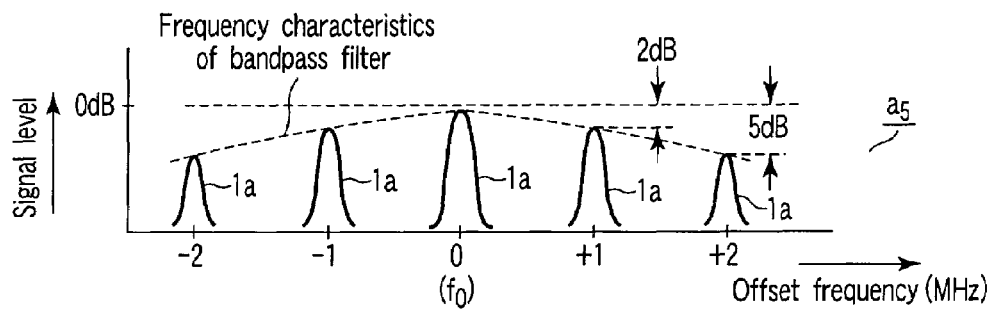
FIG. 3A
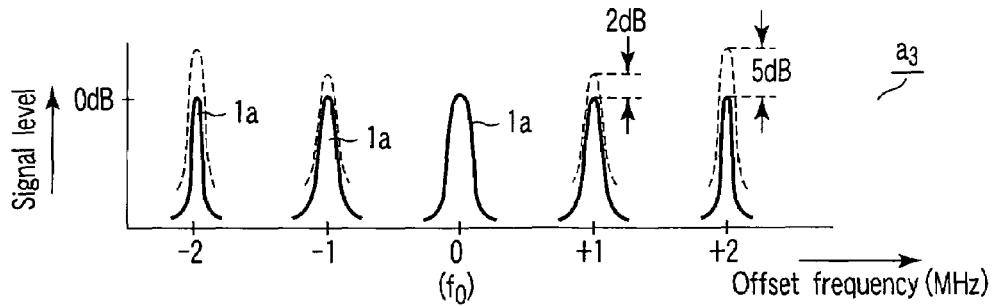
FIG. 3B

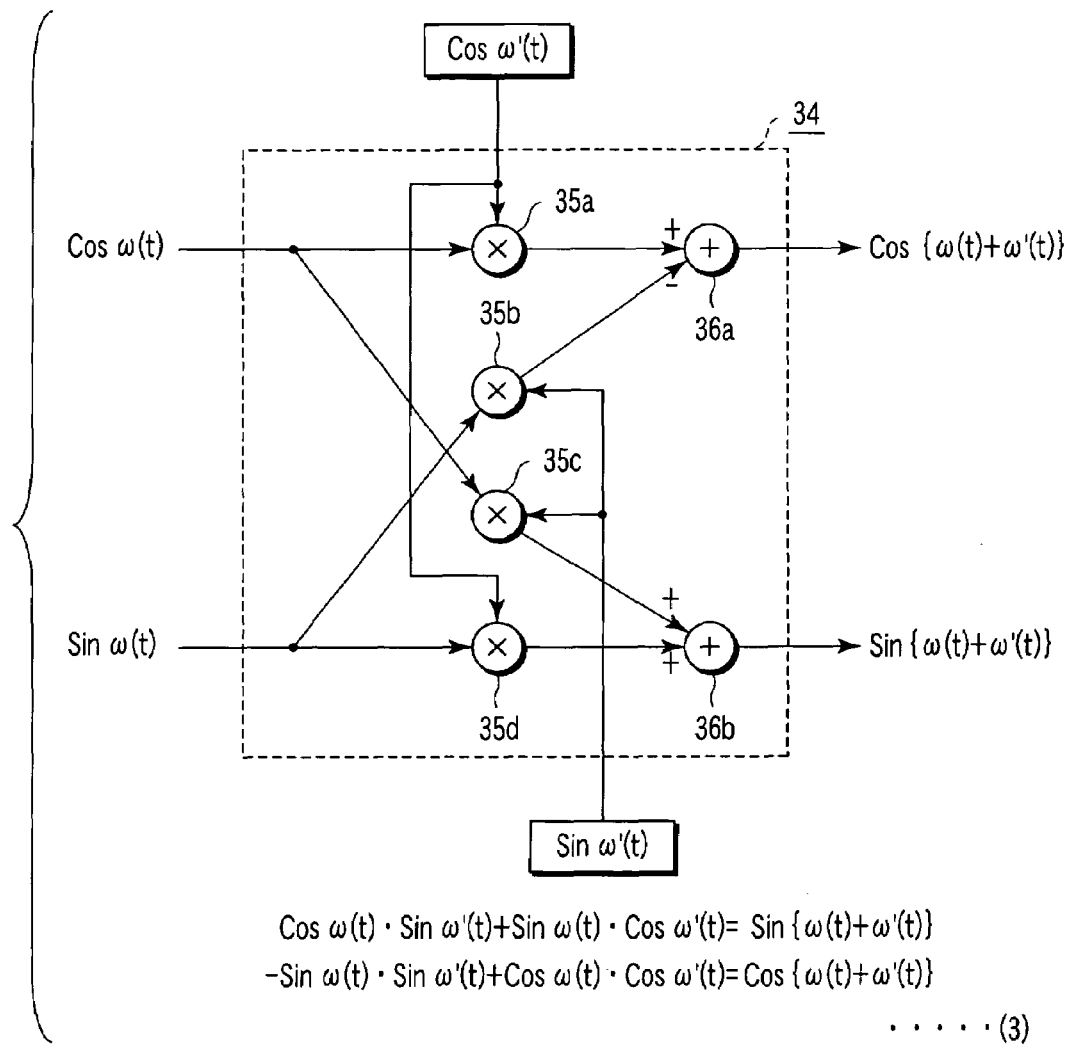
F I G. 7

| Reading numbers | Waveform types | Read starting addresses | Read ending addresses | Level offset values | Offset frequencies $\omega'$ | Numbers of repetitions |
|---|---|---|---|---|---|---|
| 1 | A | $AD_{1S}$ | $AD_{1E}$ | 0dB(0) | 0Hz | 3 |
| 2 | A | $AD_{1S}$ | $AD_{1E}$ | +2dB(0) | +1MHz | 2 |
| 3 | A | $AD_{1S}$ | $AD_{1E}$ | +5dB(0) | −2MHz | 4 |
| 4 | A | $AD_{1S}$ | $AD_{1E}$ | +5dB(0) | +2MHz | 3 |
| 5 | A | $AD_{1S}$ | $AD_{1E}$ | +2dB(0) | −1MHz | 3 |

TEST SIGNAL GENERATING APPARATUS FOR COMMUNICATIONS EQUIPMENT AND TEST SIGNAL GENERATING METHOD FOR COMMUNICATIONS EQUIPMENT

This application is a U.S. National Phase Application under 35 USC 371 of International Application PCT/JP2006/307355 filed Apr. 6, 2006.

TECHNICAL FIELD

The present invention relates to a test signal generating apparatus for communications equipment and a test signal generating method for communications equipment, and in particular, to a test signal generating apparatus for communications equipment and a test signal generating method for communications equipment by which a modulating signal including at least one or more types of unit data is generated as a test signal for communications equipment.

BACKGROUND ART

When communications equipment such as a mobile communication terminal, for example, a mobile telephone is newly developed, some sort of malfunction may be brought about in a mobile telephone in operation, or a mobile telephone in operation has expired a predetermined duration of service in some instances. In such a case, a communication test is required for confirming that various functions of these mobile telephones function normally.

Specifically, there is required a communication test for confirming that it is possible for a mobile telephone serving as a test object for such a communication test to normally execute transmission and reception of various signals to and from a base station.

In this case, in reality, it is impossible to execute a communication test by using a base station in operation. For this reason, the test is performed by using a pseudo-base station device (mobile network simulator device) having the functions of the base station (refer to the following Patent Document 1).

Pat. Document 1: Jpn. Pat. Appln. KOKAI Publication No. 2004-330594

In this communication test using a mobile network simulator device, various signals (modulating signals) are transmitted from a test signal generating apparatus incorporated in the mobile network simulator device to a mobile telephone serving as a test object, in place of a base station. In addition, a reply signal from the mobile telephone is received by a receiver separately provided in the mobile network simulator device. Consequently, a signal level of the reply signal, a content of the reply signal, and the like are checked on, and it is verified whether or not the mobile telephone serving as a test object functions normally.

For example, in order to test a power control function of reply signals of a mobile telephone serving as a test object to a base station, a communication test is performed. The communication test is to confirm that, by sequentially lowering signal levels of test signals to be transmitted to the mobile telephone serving as a test object from the test signal generating apparatus incorporated in a mobile network simulator device, signal levels of reply signals from the mobile telephone serving as a test object sequentially rise.

Further, as shown in FIG. 4, assume a case in which there is a Global System for Mobile Communication (GSM) digital mobile telephone system mode signal within a range (cell) of receiving a Wideband Code Division Multiple Access (WCDMA) signal. In this case, a phenomenon is brought about in which a frequency of the GSM signal discretely moves about a frequency of the WCDMA signal, which results in an interfering wave with mobile telephones in a WCDMA system.

Therefore, frequency hopping is achieved in which a frequency (carrier frequency) of a test signal imitating the GSM signal as described above is changed by a test signal generating apparatus incorporated in a mobile network simulator device, so that a communication test for grasping resistance of a mobile telephone in a WCDMA system serving as a test object with respect to an interfering wave by a GSM signal is executed.

In addition to several communication tests as described above, various communication tests are executed for grasping characteristics of various functions of a mobile telephone based on reply signals of the mobile telephone serving as a test object are executed in such a manner that various test signals are transmitted from the test signal generating apparatus to the mobile telephone serving as a test object.

Accordingly, in a communication test using a mobile network simulator device in this way, a test signal generating apparatus incorporated in the mobile network simulator device is required to prepare test signals having different data, different signal levels, and different frequencies for each of various communication tests.

In the following Patent Document 2, as one of techniques of preparing highly accurate test signals in large quantity and for a short time, there is disclosed some of a technology in which signal waveforms of respective test signals are stored in advance in a memory unit, and the stored signal waveforms are read out to be output as test signals.

Pat. Document 2: Jpn. Pat. Appln. KOKAI Publication No. 7-273555

However, as in the Patent Document 2 described above, there are still the following problems to be solved even in the technology in which signal waveforms stored in advance in a memory unit are read out to be output as test signals.

First, when a frequency hopping signal is generated by using a sequence function of a test signal generator with a wideband width baseband, frequency offset is applied. However, there is a problem that waveform data whose frequency characteristics have been corrected in accordance with the frequency offset must be prepared every frequency offset after high-level accuracy in each hopping frequency is insured.

In this case, frequency characteristics differ each of the respective frequency offsets serving as test objects. For this reason, types of test signals including waveform data whose frequency characteristics have been corrected in accordance with each frequency offset are made to be in vast numbers. Accordingly, there is a problem that a memory capacity required for a memory device such as a hard disk drive which stores respective signal waveforms of those test signals is greatly increased.

Further, in this case, level correction values for correcting frequency characteristics in accordance with each of the respective frequency offsets are stored in advance in a waveform memory, and a frequency characteristic corresponding to each frequency offset is corrected. Consequently, there is a problem that a memory capacity of the waveform memory is greatly increased.

Further, there is a problem that a large amount of labor is required for an operation of generating signal waveforms of test signals having different waveform data, different signal levels, and different frequencies for each of various communication tests for a mobile telephone serving as a test object.

Furthermore, because frequency characteristics differ every mobile telephone serving as a test object, there is a problem that a large amount of labor and time-consuming are required for generating signal waveforms of test signals having frequency characteristics which differ every mobile telephone serving as a test object.

Moreover, in various communication tests for communications equipment such as mobile communication terminals, continuity of frames in a test signal is required. As a consequence, continuity of waveform data at the time of switching the waveforms of the test signal is required, and in many cases, same data is repeatedly used several times depending on a test signal. Therefore, there is a problem that a function of repeatedly outputting same data several times is required in order to insure continuity of waveform data at the time of switching.

DISCLOSURE OF INVENTION

In order to solve the problems in a prior art as described above, an object of the present invention is to provide a test signal generating apparatus for communications equipment and a test signal generating method for communications equipment which can keep a required memory capacity of a memory device to a minimum, and can greatly reduce an operation of generating signal waveforms of a test signal, and which can handle even when identical data is repeatedly used several times while insuring high-level accuracy in each hopping frequency.

In order to achieve the above object, according to a first aspect of the present invention, there is provided a test signal generating apparatus for communications equipment, comprising:

a pair of waveform memories (2, 3) in which I component waveform digital data (hereinafter, referred to as I waveform data) and Q component waveform digital data (hereinafter, referred to as Q waveform data) which configure a set of digital baseband quadrature signals I and Q in at least one or more types of unit data serving as sources of a test signal to be finally output, are respectively stored in advance at predetermined addresses;

a read control unit (7) to sequentially output the I waveform data and the Q waveform data from the pair of waveform memories;

a pair of multipliers (9, 10) to set signal levels of the I waveform data and the Q waveform data which are sequentially output from the pair of waveform memories to desired signal levels by the read control unit, respectively;

a pair of digital-to-analog converters (19, 20) which convert the I waveform data and the Q waveform data which are sequentially output from the pair of multipliers into an I waveform analog signal and a Q waveform analog signal, respectively;

a frequency offset unit (34) which sets offset frequencies for providing frequency offsets at a plurality of steps every predetermined intervals by using a predetermined carrier frequency provided to the test signal as a reference, with respect to the I waveform data and the Q waveform data between the pair of waveform memories and the pair of digital-to-analog converters;

a sequence memory (4a) which stores in advance: first sequence information including a reading order and read addresses of the unit data including the I waveform data and the Q waveform data stored in the pair of waveform memories, and the desired signal levels to be set in the unit data including the I waveform data and the Q waveform data read from the pair of waveform memories; and second sequence information including the offset frequencies set for providing frequency offsets at a plurality of steps every predetermined intervals by using the predetermined carrier frequency provided to the test signal as a reference, with respect to the unit data including the I waveform data and the Q waveform data read from the pair of waveform memories;

a sequence control unit (6a) which reads the first sequence information from the sequence memory, instructs the read control unit about the reading order and the read addresses included in the first sequence information thereby causing to sequentially output the I waveform data and the Q waveform data from the pair of waveform memories, and instructs the pair of multipliers about the desired signal levels included in the first sequence information in response to a timing at which the I waveform data and the Q waveform data are output from the pair of waveform memories thereby causing to set signal levels of the I waveform data and the Q waveform data which are sequentially output from the pair of waveform memories respectively to the desired signal levels, and further reads the second sequence information from the sequence memory, and instructs the frequency offset unit about the offset frequencies included in the second sequence information thereby causing to set the offset frequencies for providing frequency offsets at a plurality of steps every predetermined intervals by using the predetermined carrier frequency provided to the test signal as a reference, with respect to the unit data including the I waveform data and the Q waveform data; and a test signal output unit (100) which converts the I waveform analog signal and the Q waveform data signal which are sequentially output from the pair of digital-to-analog converters into a high-frequency signal by using a carrier frequency signal after carrying out quadrature modulation to the signals, thereby causing to output the high-frequency signal finally in form of the modulating signal and as a test signal along with frequency offsets at a plurality of steps every predetermined intervals by using the predetermined frequency as a reference.

In order to achieve the above object, according to a second aspect of the present invention, there is provided the test signal generating apparatus for communications equipment according to the first aspect, wherein the frequency offset unit is provided between the pair of waveform memories and the pair of multipliers.

In order to achieve the above object, according to a second aspect of the present invention, there is provided the test signal generating apparatus for communications equipment according to the first aspect, wherein the frequency offset unit is provided between the pair of multipliers and the pair of digital-to-analog converters.

In order to achieve the above object, according to a fourth aspect of the present invention, there is provided the test signal generating apparatus for communications equipment according to the first aspect, wherein the test signal output unit comprises:

a quadrature modulator (21) which quadrature-modulates the I waveform analog signal and the Q waveform analog signal which are sequentially output from the pair of digital-to-analog converters by using a local oscillation signal from a local oscillator (21a), to be output as a modulating signal;

a frequency converter (22) which converts the modulating signal output from the quadrature modulator into a high-frequency signal by using a carrier frequency signal from an oscillator (23), to be output in form of the modulating signal and as a test signal along with a predetermined carrier frequency; and a band-pass filter (24) which eliminates unnecessary frequency components included in the test signal output from the frequency converter, thereby causing to output the test signal finally in form of the modulating signal and as a test signal along with offset frequencies at a plurality of steps every predetermined intervals by using the predetermined carrier frequency as a reference.

In order to achieve the above object, according to a fifth aspect of the present invention, there is provided the test signal generating apparatus for communications equipment according to the fourth aspect, wherein when at least the band-pass filter is provided as a component having an uneven frequency characteristic to the test signal output unit, the sequence memory stores in advance third sequence information including level offset values for setting level offset values from a signal level at the predetermined carrier frequency serving as the reference to be greater, as there becomes greater an absolute value of offset frequencies for providing frequency offsets at a plurality of steps every predetermined intervals by using as a reference the predetermined carrier frequency provided to the test signal as the offset frequencies included in the second sequence information, and the sequence control unit reads the third sequence information from the sequence memory, and instructs the pair of multipliers about the level offset values included in the third sequence information in response to a timing at which the I waveform data and the Q waveform data are output from the pair of waveform memories, thereby causing to set level offset values from a signal level at the predetermined carrier frequency serving as the reference to be greater, as there becomes greater an absolute value of offset frequencies for providing frequency offsets at a plurality of steps every predetermined intervals by using as a reference the predetermined carrier frequency provided to the test signal as the offset frequency information included in the second sequence information.

In order to achieve the above object, according to a sixth aspect of the present invention, there is provided the test signal generating apparatus for communications equipment according to the first aspect, wherein the sequence memory stores in advance fourth sequence information including the number of repetitions of reading I waveform data and Q waveform data for each of the unit data from the pair of waveform memories in order to set the number of repetitions for each of the unit data included in the test signal to be finally output, and the sequence control unit reads the fourth sequence information from the sequence memory, and instructs the read control unit about the number of repetitions of reading I waveform data and Q waveform data for each of the unit data included in the fourth sequence information from the pair of waveform memories in response to a timing at which the I waveform data and the Q waveform data are output from the pair of waveform memories, thereby causing to sequentially output from the pair of waveform memories the unit data continuously the number of times corresponding to the number of repetitions of reading I waveform data and Q waveform data for each of the unit data from the pair of waveform memories.

In order to achieve the above object, according to a seventh aspect of the present invention, there is provided the test signal generating apparatus for communications equipment according to the first aspect, wherein the second sequence information including offset frequencies to be stored in the sequence memory is set as offset frequencies which enable to achieve frequency hopping which enables achieving a carrier frequency f of a test signal imitating a Global System for Mobile Communication (GSM) signal as the test signal is made to vary with time, whereby it is possible to achieve an interfering wave resistance test for a device to be tested in a Wideband Code Division Multiple Access (WCDMA) system by means of the GSM signal in such a manner that the GSM signal discretely moves within a range of received frequencies of the device to be tested in the WCDMA system.

In order to achieve the above object, according to an eighth aspect of the present invention, there is provided the test signal generating apparatus for communications equipment according to the first aspect, wherein the pair of multipliers multiply the I waveform data and the Q waveform data output from the pair of waveform memories by a gain multiplication value determined based on the signal levels instructed by the sequence control unit, thereby causing to set signal levels of the I waveform data and the Q waveform data output from the pair of waveform memories to the signal levels included in the first sequence information which is stored in the sequence memory.

In order to achieve the above object, according to a ninth aspect of the present invention, there is provided the test signal generating apparatus for communications equipment according to the fifth aspect, wherein the pair of multipliers multiply the I waveform data and the Q waveform data output from the pair of waveform memories by a gain multiplication value determined based on the level offset values included in the third sequence information, the level offset values being instructed by the sequence control unit, thereby causing to set signal levels of the I waveform data and the Q waveform data read from the pair of waveform memories to the level offset values included in the third sequence information which is stored in the sequence memory.

In order to achieve the above object, according to a tenth aspect of the present invention, there is provided the test signal generating apparatus for communications equipment according to the first aspect, further comprising:

a test database (27) formed in a hard disk drive having provided therein a waveform database (28) which stores I waveform data and Q waveform data of the unit data included in the test signal and a sequence database (27) which stores various sequence information; and a data writing unit (32) connected to the test database, wherein the I waveform digital data and the Q waveform digital data stored in the waveform database, and the various sequence information stored in the sequence database are prepared outside, and downloaded into the test database, and when I waveform digital data and Q waveform digital data corresponding to a test signal to be newly output are read from the waveform database via the data writing unit and written into the pair of waveform memories, and at the same time, sequence information corresponding to the test signal to be newly output is read from the sequence database and written into the sequence memory.

In order to achieve the above object, according to an eleventh aspect of the present invention, there is provided the test signal generating apparatus for communications equipment according to the first aspect, further comprising:

a numerical control oscillator (33) which causes the sequence control unit to specify, as the offset frequencies included in the second sequence information read from the sequence memory, offset frequencies ($\omega'$) for providing frequency offsets at a plurality of steps every predetermined intervals by using the predetermined carrier frequency provided to the test signal as a reference, wherein the numerical control oscillator generates a sine wave sin ω'(t) and a cosine wave cos ω'(t) which correspond to the offset frequencies (ω') specified by the sequence control unit, and transmits those to the frequency offset unit, and when frequencies ω (=2πf) of the I waveform data and the Q waveform data are offset by offset frequencies ω' (=2πf') stored in the sequence memory, the frequency offset unit carries out frequency offset processing in such a manner that, when the I waveform data and the Q waveform data are respectively denoted by:

$$\cos \omega(t), \sin \omega(t) \quad (1),$$

the sine wave and cosine wave are converted respectively into:

$$\cos \{\omega(t)+\omega'(t)\}, \sin \{\omega(t)+\omega'(t)\} \quad (2).$$

In order to achieve the above object, according to a twelfth aspect of the present invention, there is provided the test signal generating apparatus for communications equipment according to the eleventh aspect, wherein when the formula (2) is expressed by using the formula (1) and the offset frequencies (ω') to be:

$$\cos \{\omega(t)+\omega'(t)\}=-\sin \omega(t) \cdot \sin \omega'(t)+\cos \omega(t) \cdot \cos \omega'(t),$$

$$\sin \{\omega(t)+\omega'(t)\}=\cos \omega(t) \cdot \sin \omega'(t)+\sin \omega(t) \cdot \cos \omega'(t) \quad (3),$$

the frequency offset unit achieves frequency offsets represented by the formula (3).

In order to achieve the above object, according to a thirteenth aspect of the present invention, there is provided the test signal generating apparatus for communications equipment according to the twelfth aspect, wherein in order to achieve the frequency offsets represented by the formula (3), the frequency offset unit comprises:

first and second multipliers (35a, 35d) which multiply the I waveform data cos ω(t) and the Q waveform data sin ω(t) respectively by a first frequency offset component cos ω'(t);

third and fourth multipliers (35c, 35b) which multiply the I waveform data cos ω(t) and the Q waveform data sin ω(t) respectively by a second frequency offset component sin ω'(t);

a first adder (36a) which outputs the first frequency offset cos {ω(t)+ω'(t)}=−sin ω(t)·sin ω'(t)+cos ω)(t)·cos ω'(t) by adding an output from the first multiplier and an output from the fourth multiplier; and a second adder (36b) which outputs the second frequency offset sin {ω(t)+ω'(t)}=cos ω(t) sin ω'(t)+sin ω(t)·cos ω'(t) by adding an output from the second multiplier and an output from the third multiplier.

In order to achieve the above object, according to a fourteenth aspect of the present invention, there is provided a test signal generating method for communications equipment, comprising:

a step of respectively storing in advance I component waveform digital data (hereinafter, referred to as I waveform data) and Q component waveform digital data (hereinafter, referred to as Q waveform data) which configure a set of digital baseband quadrature signals I and Q in at least one or more types of unit data serving as sources of a test signal to be finally output, at predetermined addresses of a pair of waveform memories (2, 3);

a step of causing a sequence memory (4a) to store in advance, first sequence information including a reading order and read addresses of the unit data including the I waveform data and the Q waveform data stored in the pair of waveform memories, and the desired signal levels to be set in the unit data including the I waveform data and the Q waveform data read from the pair of waveform memories, and second sequence information including the offset frequencies which are set for providing frequency offsets at a plurality of steps every predetermined intervals by using the predetermined carrier frequency provided to the test signal as a reference, with respect to the unit data including the I waveform data and the Q waveform data read from the pair of waveform memories;

a step of causing a sequence control unit (6a) to read the first sequence information from the sequence memory, and instruct a read control unit about the reading order and the read addresses included in the first sequence information to sequentially output the I waveform data and the Q waveform data from the pair of waveform memories;

a step of causing the sequence control unit to read the first sequence information from the sequence memory, and instruct a pair of multipliers (9, 10) about the desired signal levels included in the first sequence information in response to a timing at which the I waveform data and the Q waveform data are output from the pair of waveform memories, thereby respectively setting signal levels of the I waveform data and the Q waveform data which are sequentially output from the pair of waveform memories to the desired signal levels;

a step of causing a pair of digital-to-analog converters (19, 20) to respectively convert the I waveform data and the Q waveform data which are sequentially output from the pair of multipliers into an I waveform analog signal and a Q waveform analog signal;

a step of, at a digital stage from the pair of waveform memories up to the pair of digital-to-analog converters, causing the sequence control unit to read the second sequence information from the sequence memory, and instruct a frequency offset unit (34) about the offset frequencies included in the second sequence information to set the offset frequencies for providing frequency offsets at a plurality of steps every predetermined intervals by using the predetermined carrier frequency provided to the test signal as a reference, with respect to the unit data including the I waveform data and the Q waveform data; and a step of causing a test signal output unit (100) to convert the I waveform analog signal and the Q waveform analog signal which are sequentially output from the pair of digital-to-analog converters into a high-frequency signal by using a carrier frequency signal after carrying out quadrature-modulation to the signals, to be output finally in form of the modulating signal and as a test signal along with frequency offsets at a plurality of steps every predetermined intervals by using the predetermined carrier frequency as a reference.

In order to achieve the above object, according to a fifteenth aspect of the present invention, there is provided the test signal generating method for communications equipment according to the fourteenth aspect, wherein the step of setting the frequency offsets is carried out in a frequency offset unit provided between the pair of waveform memories and the pair of multipliers.

In order to achieve the above object, according to a sixteenth aspect of the present invention, there is provided the test signal generating method for communications equipment according to the fourteenth aspect, wherein the step of setting the offset frequency information is carried out in a frequency offset unit provided between the pair of multipliers and the pair of digital-to-analog converters.

In order to achieve the above object, according to a seventeenth aspect of the present invention, there is provided the test signal generating method for communications equipment according to the fourteenth aspect, wherein the step of outputting the I waveform analog signal and the Q waveform analog signal finally in form of the modulating signal and as a test signal along with frequency offsets at a plurality of steps every predetermined intervals by using the predetermined frequency as a reference, comprises:

a step of causing a quadrature modulator (21) to output the I waveform analog signal and the Q waveform analog signal which are sequentially output from the pair of digital-to-analog converters, as a modulating signal quadrature-modulated by using a local oscillation signal from a local oscillator (21a);

a step of causing a frequency converter (22) to convert the modulating signal output from the quadrature modulator into a high-frequency signal by using a carrier frequency signal from an oscillator (23), to be output in form of the modulating signal and as a test signal along with the predetermined carrier frequency; and a step of causing a band-pass filter (24) to eliminate unnecessary frequency components included in a test signal output from the frequency converter, to be output finally in form of the modulating signal and as a test signal along with frequency offsets at a plurality of steps every predetermined intervals by using the predetermined carrier frequency as a reference.

In order to achieve the above object, according to an eighteenth aspect of the present invention, there is provided the test signal generating method for communications equipment according to the seventeenth aspect, further comprising:

when at least the band-pass filter is provided as a component having an uneven frequency characteristic to the test signal output unit, a step of causing the sequence memory to store in advance third sequence information which includes level offset values for setting level offset values from a signal level at the predetermined carrier frequency serving as the reference to be greater, as there becomes greater an absolute value of offset frequencies for providing frequency offsets at a plurality of steps every predetermined intervals by using as a reference the predetermined carrier frequency provided to the test signal as the offset frequencies included in the second sequence information; and a step of causing the sequence control unit to read the third sequence information from the sequence memory, and instruct the pair of multipliers about the level offset values included in the third sequence information in response to a timing at which the I waveform data and the Q waveform data are output from the pair of waveform memories, thereby setting level offset values from a signal level at the predetermined carrier frequency serving as the reference to be greater, as there becomes greater an absolute value of offset frequencies for providing frequency offsets at a plurality of steps every predetermined intervals by using as a reference the predetermined carrier frequency provided to the test signal as the offset frequencies included in the second sequence information.

In order to achieve the above object, according to a nineteenth aspect of the present invention, there is provided the test signal generating method for communications equipment according to the fourteenth aspect, further comprising:

a step of causing the sequence memory to store in advance fourth sequence information including the number of repetitions of reading I waveform data and Q waveform data for each of the unit data from the pair of waveform memories in order to set the number of repetitions for each of the unit data included in the test signal to be finally output; and a step of causing the sequence control unit to read the fourth sequence information from the sequence memory, and instruct the read control unit about the number of repetitions of reading I waveform data and Q waveform data for each of the unit data included in the fourth sequence information from the pair of waveform memories in response to a timing at which the I waveform data and the Q waveform data are output from the pair of waveform memories, thereby sequentially outputting from the pair of waveform memories the unit data continuously the number of times corresponding to the number of repetitions of reading I waveform data and Q waveform data for each of the unit data from the pair of waveform memories.

In order to achieve the above object, according to a twentieth aspect of the present invention, there is provided the test signal generating method for communications equipment according to the fourteenth aspect, wherein, in the step of causing the sequence memory to store in advance the second sequence information including the offset frequencies, the second sequence information including the offset frequencies to be stored in the sequence memory is set as offset frequencies at which frequency hopping which enables achieving a carrier frequency of a test signal imitating a Global System for Mobile Communication (GSM) signal as the test signal is made to vary with time, whereby it is possible to achieve an interfering wave resistance test for a device to be tested in a Wideband Code Division Multiple Access (WCDMA) system by the GSM signal in such a manner that the GSM signal discretely moves within a range of received frequencies of the device to be tested in the WCDMA system.

In order to achieve the above object, according to a twenty-first aspect of the present invention, there is provided the test signal generating method for communications equipment according to the fourteenth aspect, wherein, in the step of setting signal levels of the I waveform data and the Q waveform data which are sequentially output from the pair of waveform memories to desired signal levels respectively, the pair of multipliers are used to multiply the I waveform data and the Q waveform data output from the pair of waveform memories by a gain multiplication value determined based on the signal levels instructed by the sequence control unit, whereby signal levels of the I waveform data and the Q waveform data read from the pair of waveform memories are set to the signal levels included in the first sequence information stored in the sequence memory.

In order to achieve the above object, according to a twenty-second aspect of the present invention, there is provided the test signal generating method for communications equipment according to the eighteenth aspect, wherein, in the step of setting signal levels of the I waveform data and the Q waveform data which are sequentially output from the pair of waveform memories to desired signal levels respectively, the pair of multipliers are used to multiply the I waveform data and the Q waveform data output from the pair of waveform memories by a gain multiplication value determined based on the level offset values included in the third sequence information, which are instructed by the sequence control unit, whereby signal levels of the I waveform data and the Q waveform data read from the pair of waveform memories are set to the level offset values included in the third sequence information stored in the sequence memory.

In order to achieve the above object, according to a twenty-third aspect of the present invention, there is provided the test signal generating method for communications equipment according to the fourteenth aspect, further comprising:

a step of preparing: a test database (27) formed in a hard disk drive having provided therein a waveform database (28) which stores the I waveform data and the Q waveform data of the unit data included in the test signal and a sequence database (29) which stores various sequence information; and a data writing unit (32) connected to the test database;

a step of downloading into the test database the I waveform data and the Q waveform data which are prepared outside to be stored in the waveform database, and the various sequence information stored in the sequence database; and a step of causing the data writing unit to read from the waveform database the I waveform data and the Q waveform data corresponding to a test signal to be newly output to be written into the pair of waveform memories, and read sequence information corresponding to the test signal to be newly output from the sequence database to be written into the sequence memory.

In order to achieve the above object, according to a twenty-fourth aspect of the present invention, there is provided the test signal generating method for communications equipment according to the fourteenth aspect, wherein the step of setting the offset frequencies comprises:

a step of causing a numerical control oscillator (33) to specify offset frequencies ($\omega'$) for providing frequency offsets at a plurality of steps every predetermined intervals by using as a reference the predetermined carrier frequency of the test signal, as the offset frequencies included in the second sequence information read from the sequence memory;

a step of causing the numerical control oscillator to generate a sine wave $\sin \omega'(t)$ and a cosine wave $\cos \omega'(t)$ which correspond to the offset frequencies ($\omega'$) specified by the sequence control unit to be transmitted to the frequency offset unit; and a step of, when frequencies $\omega$ (=$2\pi f$) of the I waveform data and the Q waveform data are offset by offset frequencies $\omega'$(=$2\pi f'$) stored in the sequence memory, causing the frequency offset unit to carry out frequency offset processing in such a manner that, when the I waveform data and the Q waveform data are respectively denoted by:

$$\cos \omega(t), \sin \omega(t) \qquad (1),$$

the sine wave and cosine wave are converted respectively into:

$$\cos \{\omega(t)+\omega'(t)\}, \sin \{\omega(t)+\omega'\}(t) \qquad (2).$$

In order to achieve the above object, according to a twenty-fifth aspect of the present invention, there is provided the test signal generating method for communications equipment according to the twenty-fourth aspect, wherein the step of causing the frequency offset unit to carry out frequency offset processing achieves the frequency offsets represented by the formula (3) when the formula (2) is expressed by using the formula (1) and the offset frequencies ($\omega'$) to be:

$$\cos \{\omega(t)+\omega'(t)\}=-\sin \omega(t)\cdot\sin \omega'(t)+\cos \omega(t)\cdot\cos \omega'(t),$$

$$\sin \{\omega(t)+\omega'(t)\}=\cos \omega(t)\cdot\sin \omega'(t)+\sin \omega(t)\cdot\cos \omega'(t) \qquad (3),$$

In order to achieve the above object, according to a twenty-sixth aspect of the present invention, there is provided the test signal generating method for communications equipment according to the twenty-fifth aspect, wherein in order to achieve the frequency offsets represented by the formula (3), the step of causing the frequency offset unit to carry out frequency offset processing comprises:

a step of causing first and second multipliers (35a, 35d) to multiply the I waveform data $\cos \omega(t)$ and the Q waveform data $\sin \omega(t)$ respectively by a first frequency offset component $\cos \omega'(t)$;

a step of causing third and fourth multipliers (35c, 35b) to multiply the I waveform data $\cos \omega(t)$ and the Q waveform data $\sin \omega(t)$ by a second frequency offset component $\sin \omega'(t)$;

a step of causing a first adder (36a) to add an output from the first multiplier and an output from the fourth multiplier, thereby outputting the first frequency offset $\cos \{\omega(t)+\omega'(t)\}=-\sin \omega(t)\cdot\sin \omega'(t)+\cos \omega(t)\cdot\cos \omega'(t)$; and a step of causing a second adder (36b) to add an output from the second multiplier and an output from the third multiplier, thereby outputting the second frequency offset $\sin \{\omega(t)+\omega'(t)\}=\cos \omega(t)\cdot\sin \omega'(t)+\sin \omega(t)\cdot\cos \omega'(t)$.

A test signal to be finally output to a test object from the test signal generating apparatus for communications equipment according to the first aspect configured as described above is generally composed of one or more types of unit data.

Accordingly, the pair of waveform memories store only I waveform data and Q waveform data which configure a set of digital baseband quadrature signals I and Q in at least one or more types of unit data serving as the source of a test signal to be finally output in the form of a modulating signal and with a predetermined carrier frequency.

Further, the sequence memory stores first sequence information including numbers denoting an output order of waveforms included in a modulating signal to be finally output as a test signal, waveform types denoting types of respective waveforms of each of the respective numbers, and read addresses of the respective waveform memories for reading I waveform data and Q waveform data of each of the respective numbers, and second sequence information including offset frequencies which are set for providing frequency offsets at a plurality of steps every predetermined intervals by using a predetermined carrier frequency provided to a test signal to be finally output as a reference, with respect to the unit data including the I waveform data and Q waveform data from the waveform memories.

As a consequence, first, I waveform data and Q waveform data of unit data are sequentially read from the respective waveform memories by the read control unit in accordance with the content of the first sequence information in the sequence memory read by the sequence control unit.

Then, the I waveform data and the Q waveform data sequentially read from the respective waveform memories are respectively converted into analog signals by the pair of digital-to-analog converters, and then quadrature-modulated at the test signal output unit, and frequencies are converted into high-frequency signals by using a carrier frequency signal. Therefore, the I waveform data and the Q waveform data are output as a test signal in the form of a modulating signal and with a predetermined carrier frequency from the test signal output unit.

According to such a configuration, a required memory capacity of the pair of waveform memories as a memory device can be kept to a minimum when respective unit data are equal.

Further, when unit data are equal, and a new test signal differing in an order of outputting unit data, a signal level, the number of repetitions, and the like is required, there is no need to newly generate waveform data themselves. It merely suffices to prepare new sequence information satisfying such conditions to be stored in the sequence memory.

Furthermore, with respect to the I waveform data and the Q waveform data sequentially read from the respective waveform memories at an offset frequency included in the second sequence information from the sequence memory read out by the sequence control unit, offset frequencies for providing frequency offsets at a plurality of steps every predetermined intervals by using as a reference a predetermined carrier frequency provided to a test signal by the frequency offset unit are set at the digital stage from the respective waveform memories to the respective digital-to-analog converters.

Consequently, with respect to a test signal to be finally output from the test signal generating apparatus, frequencies of a plurality of unit data which are included in the test signal so as to be arranged on the time axis, and which are the same or different from one another are along with predetermined offsets at the digital stage of I waveform data and Q waveform data.

Namely, the test signal to be finally output from the test signal generating apparatus is output in the form of a modulating signal and as a test signal along with frequency offsets at a plurality of steps every predetermined intervals by using a predetermined carrier signal as a reference.

More specifically, when the I waveform data and the Q waveform data along with the predetermined frequency offsets are quadrature-modulated after being converted into analog signals at the subsequent stage, and are output as a test signal whose frequency is converted based on a carrier frequency signal, these data are output as a test signal whose center frequency varies with time change so as to correspond to a frequency offset.

In this way, a test signal whose center frequency varies with time change so as to correspond to a frequency offset is set to be included in the second sequence information in the sequence memory, as an offset frequency which enables achieving frequency hopping in which a carrier frequency as a test signal imitating a GSM signal is changed in accordance with time. This makes it possible to achieve an interfering wave resistance test for a device to be tested in a WCDMA system by the GSM signal due to the GSM signal imitatively moving within a range of reception frequency of the device to be tested in the WCDMA system.

Offset frequencies, which are set for providing frequency offsets at a plurality of steps every predetermined intervals by using a predetermined carrier frequency of the test signal as a reference, are included in the unit data including the I waveform data and the Q waveform data in the second sequence information in the sequence memory. As a result, sizes of waveform data required for achieving frequency hopping can be reduced as much as possible.

For example, when a test signal imitating a GSM signal is output under the condition that a frequency band of a test signal at the time of achieving frequency hopping is 200 kHz and an output time is 1 sec, there is a considerable difference in a required size of waveform data depending whether or not there is the frequency offset function as described above.

Namely, when there is the frequency offset function, it suffices to prepare only signals of offset 0 MHz: 800 kbyte. In contrast thereto, when there is no frequency offset function, it is necessary to prepare signals of offset 10 MHz: 101 Mbyte.

Accordingly, by providing the frequency offset function, a memory capacity of a pair of waveform memories as a memory device required for achieving such frequency hopping can be kept to a minimum.

Further, assuming that a test signal is output whose center frequency varies with time change so as to correspond to a frequency offset. In such a case, when a component having an uneven frequency characteristic, such as a band-pass filter (BPF), a quadrature modulator or an amplifier, is incorporated into the test signal output unit at the subsequent stage of the test signal generating apparatus, it is necessary to compensate a level fluctuation attributable to all or some frequency characteristics thereof.

Then, in order to compensate for a level fluctuation attributable to the frequency characteristics, in the test signal generating apparatus for communications equipment according to the fifth aspect, third sequence information is stored in the sequence memory. The third sequence information includes level offset values for setting level offset values based on a signal level at the predetermined carrier frequency serving as the reference to be greater, as there becomes greater an absolute value of the offset frequencies for providing frequency offsets at a plurality of steps every predetermined intervals by using as a reference a predetermined carrier frequency provided to a test signal as the offset frequencies included in the second sequence information.

In addition, a signal level of each unit data in a test signal is changed by a level offset value corresponding to the frequency characteristics described above by the pair of multipliers at the digital stage of the I waveform data and the Q waveform data, based on a level offset value included in the third sequence information from the sequence memory read by the sequence control unit.

Accordingly, even if a frequency of each unit data of a test signal is changed, it is possible to maintain the frequency characteristics of the test signal generating apparatus in its entirety to be constant.

Further, in the test signal generating apparatus configured according to the sixth aspect, it is possible to repeatedly output the same or a plurality of unit data which are arranged on the time axis of a test signal output from the test signal generating apparatus, by a predetermined number of times.

Namely, by setting the number of times of repeatedly outputting unit data into the sequence information, it is easily achieve execution of frequency shift of a test signal every unit data.

As described above, in the test signal generating apparatus of the present invention, data of a test signal to be output are to be at least one or more types of unit data. Only I waveform data and Q waveform data in the unit data are stored in the pair of waveform memories, and the I waveform data and the Q waveform data are read from the pair of waveform memories based on the sequence information of the test signal to be output.

Consequently, a required memory capacity of the pair of waveform memories to be used as a memory device can be kept to a minimum while maintaining a signal level of the test signal output from the test signal generating apparatus to be a high accuracy. This makes it possible to reduce a manufacturing cost of the test signal generating apparatus in its entirety, and to greatly reduce a workload on an operator.

BRIEF DESCRIPTION OF DRAWINGS

FIG. 2 is a table shown for explaining memory contents in a sequence memory 4a provided in the test signal generating apparatus of FIGS. 1A and 1C.

FIG. 3A is a graph shown for explaining a relationship between a frequency characteristic and a modulating signal level in the test signal generating apparatus of FIG. 1A.

FIG. 3B is a graph shown for explaining a relationship between a frequency characteristic and a modulating signal level in the test signal generating apparatus of FIG. 1A.

FIG. 7 is a block diagram shown for explaining a detailed configuration of a frequency offset unit 34 incorporated in the test signal generating apparatus of FIG. 1A.

BEST MODE FOR CARRYING OUT THE INVENTION

Hereinafter, several embodiments of the present invention will be described with reference to the drawings.

FIRST EMBODIMENT

First, a first embodiment of a test signal generating apparatus for communications equipment according to the present invention will be concretely described with reference to FIGS. 1A, and 2 to 8.

Figure 1A:
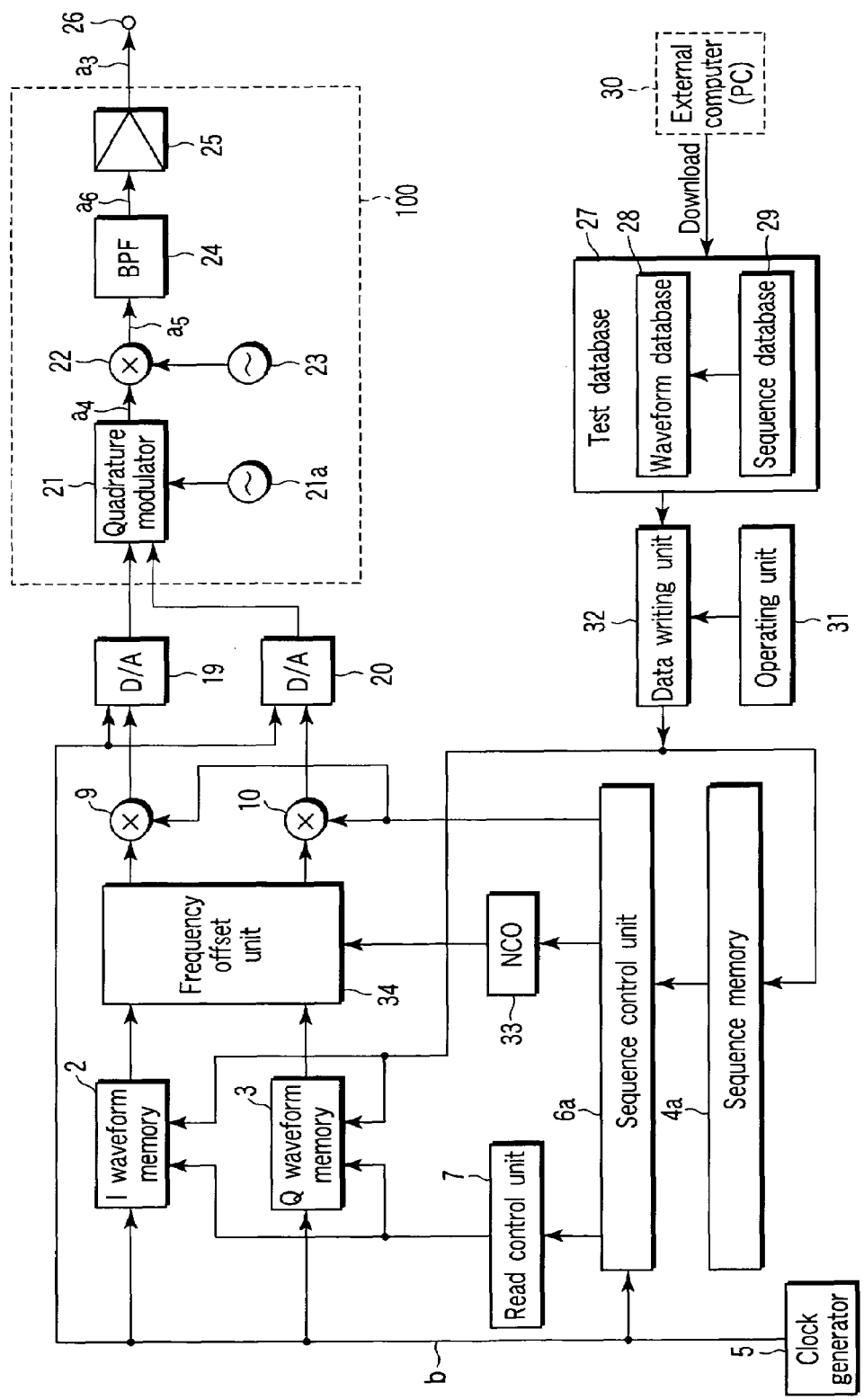
FIG. 1A is a block diagram shown for explaining a schematic configuration of a first embodiment of a test signal generating apparatus for communications equipment according to the invention.

FIG. 1A is a block diagram showing a schematic configuration of the first embodiment according to the test signal generating apparatus for communications equipment of the invention.

FIG. 2 is a table shown for explaining memory contents in a sequence memory 4a provided in the test signal generating apparatus of FIG. 1A.

FIGS. 3A and 3B are graphs shown for explaining a relationship between a frequency characteristic and a modulating signal level in the test signal generating apparatus of FIG. 1A.

Figure 4:
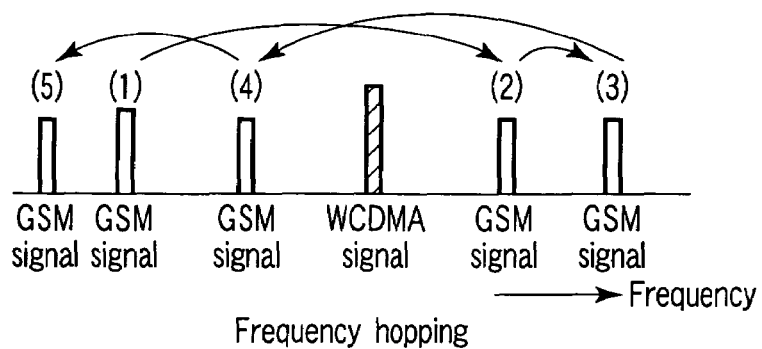
FIG. 4 is a diagram shown for explaining frequency hopping of GSM signals for use in an interfering wave resistance test executed in a prior art and the present invention.

FIG. 4 is a diagram shown for explaining frequency hopping of GSM signals for use in an interfering wave resistance test executed in the present invention.

Figure 5:
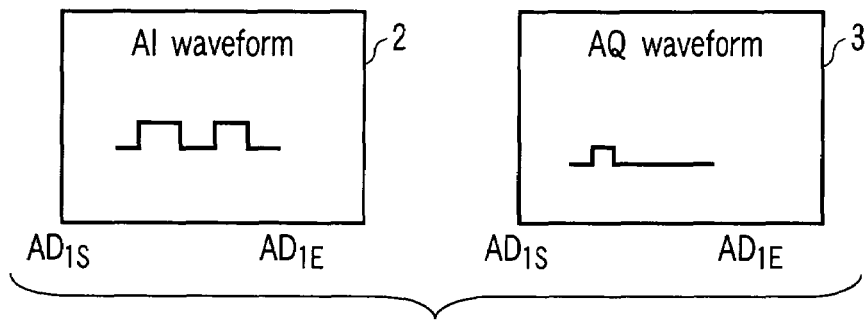
FIG. 5 is a diagram shown for explaining memory contents in a pair of waveform memories 2 and 3 formed in the test signal generating apparatus of FIG. 1A.

FIG. 5 is a diagram shown for explaining memory contents in a pair of waveform memories 2 and 3 formed in the test signal generating apparatus of FIG. 1A.

Figure 6:
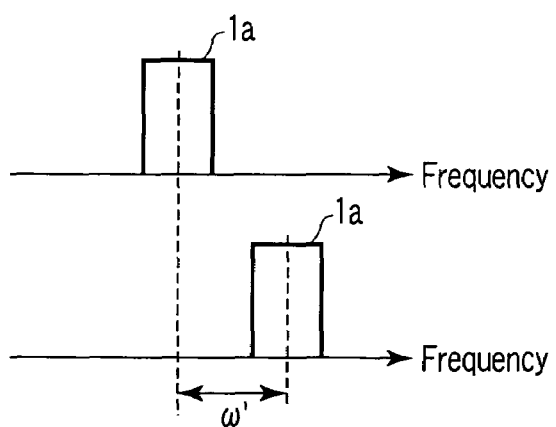
FIG. 6 is a diagram shown for explaining a frequency offset of a test signal in the test signal generating apparatus of FIG. 1A.

FIG. 6 is a diagram shown for explaining a frequency offset of a test signal in the test signal generating apparatus of FIG. 1A.

FIG. 7 is a block diagram shown for explaining a detailed configuration of a frequency offset unit 34 incorporated in the test signal generating apparatus of FIG. 1A.

Figures 8, 9:
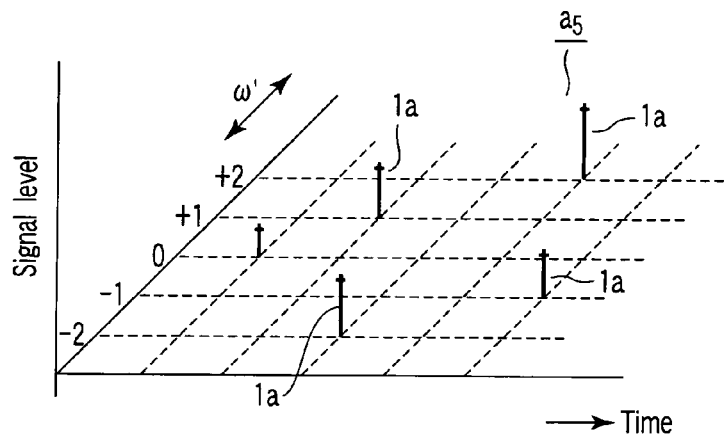
FIG. 8 is a diagram shown for explaining a configure of a test signal output from a frequency converter 22 incorporated in the test signal generating apparatus of FIG. 1A.
FIG. 9 is a table shown for explaining memory contents in a sequence memory 4b provided in the test signal generating apparatus of FIGS. 1B and 1D.

FIG. 8 is a diagram shown for explaining a configuration of a test signal output from a frequency converter 22 incorporated in the test signal generating apparatus of FIG. 1A.

The test signal generating apparatus for communications equipment according to the first embodiment is basically, as shown in FIGS. 1A, and 2 to 8, configured so as to have: a pair of waveform memories 2, 3 in which I component waveform digital data (hereinafter, referred to as I waveform data) and Q component waveform digital data (hereinafter, referred to as Q waveform data) which configure a set of digital baseband quadrature signals I and Q in at least one or more types of unit data serving as sources of a test signal to be finally output, are respectively stored in advance at predetermined addresses; a read control unit 7 to sequentially output the I waveform data and the Q waveform data from the pair of waveform memories 2, 3; a pair of multipliers 9, 10 to set signal levels of the I waveform data and the Q waveform data which are sequentially output from the pair of waveform memories 2, 3 to desired signal levels by the read control unit 7, respectively; a pair of digital-to-analog converters 19, 20 which convert the I waveform data and the Q waveform data which are sequentially output from the pair of multipliers 9, 10 into an I waveform analog signal and a Q waveform analog signal, respectively; a frequency offset unit 34 which sets offset frequencies for providing frequency offsets at a plurality of steps every predetermined intervals by using a predetermined carrier frequency provided to the test signal as a reference, with respect to the I waveform data and the Q waveform data between the pair of waveform memories 2, 3 and the pair of digital-to-analog converters 19, 20; a sequence memory 4a which stores in advance first sequence information including a reading order and read addresses of the unit data including the I waveform data and the Q waveform data stored in the pair of waveform memories 2, 3, and the desired signal levels to be set in the unit data including the I waveform data and the Q waveform data read from the pair of waveform memories 2, 3, and second sequence information including the offset frequencies set for providing frequency offsets at a plurality of steps every predetermined intervals by using the predetermined carrier frequency provided to the test signal as a reference, with respect to the unit data including the I waveform data and the Q waveform data read from the pair of waveform memories 2, 3; a sequence control unit 6a which reads the first sequence information from the sequence memory 4a, instructs the read control unit 7 about the reading order and the read addresses included in the first sequence information thereby causing to sequentially output the I waveform data and the Q waveform data from the pair of waveform memories 2, 3, and instructs the pair of multipliers 9, 10 about the desired signal levels included in the first sequence information in response to a timing at which the I waveform data and the Q waveform data are output from the pair of waveform memories 2, 3 thereby causing to set signal levels of the I waveform data and the Q waveform data which are sequentially output from the pair of waveform memories 2, 3 respectively to the desired signal levels, and further reads the second sequence information from the sequence memory 4a, and instructs the frequency offset unit 34 about the offset frequencies included in the second sequence information thereby causing to set the offset frequencies for providing frequency offsets at a plurality of steps every predetermined intervals by using the predetermined carrier frequency provided to the test signal as a reference, with respect to the unit data including the I waveform data and the Q waveform data; and a test signal output unit 100 which converts the I waveform analog signal and the Q waveform data signal which are sequentially output from the pair of digital-to-analog converters 19, 20 into a high-frequency signal by using a carrier frequency signal after carrying out quadrature modulation to the signals, thereby causing to output the high-frequency signal finally in form of the modulating signal and as a test signal along with frequency offsets at a plurality of steps every predetermined intervals by using the predetermined frequency as a reference.

Further, the test signal generating method for communications equipment according to the first embodiment is basically, as shown in FIGS. 1A and 2 to 8, configured so as to have: a step of respectively storing in advance I component waveform digital data (hereinafter, referred to as I waveform data) and Q component waveform digital data (hereinafter, referred to as Q waveform data) which configure a set of digital baseband quadrature signals I and Q in at least one or more types of unit data serving as sources of a test signal to be finally output, at predetermined addresses of a pair of waveform memories 2, 3; a step of causing a sequence memory 4a to store in advance: first sequence information including a reading order and read addresses of the unit data including the I waveform data and the Q waveform data stored in the pair of waveform memories 2, 3, and the desired signal levels to be set in the unit data including the I waveform data and the Q waveform data read from the pair of waveform memories 2, 3; and second sequence information including the offset frequencies which are set for providing frequency offsets at a plurality of steps every predetermined intervals by using the predetermined carrier frequency provided to the test signal as a reference, with respect to the unit data including the I waveform data and the Q waveform data read from the pair of waveform memories 2, 3; a step of causing a sequence control unit 6a to read the first sequence information from the sequence memory 4a, and instruct a read control unit about the reading order and the read addresses included in the first sequence information to sequentially output the I waveform data and the Q waveform data from the pair of waveform memories 2, 3; a step of causing the sequence control unit 6a to read the first sequence information from the sequence memory 4a, and instruct a pair of multipliers 9, 10 about the desired signal levels included in the first sequence information in response to a timing at which the I waveform data and the Q waveform data are output from the pair of waveform memories 2, 3, thereby respectively setting signal levels of the I waveform data and the Q waveform data which are sequentially output from the pair of waveform memories 2, 3 to the desired signal levels; a step of causing a pair of digital-to-analog converters 19, 20 to respectively convert the I waveform data and the Q waveform data which are sequentially output from the pair of multipliers 9, 10 into an I waveform analog signal and a Q waveform analog signal; a step of, at a digital stage from the pair of waveform memories 2, 3 up to the pair of digital-to-analog converters 19, 20, causing the sequence control unit 6a to read the second sequence information from the sequence memory 4a, and instruct a frequency offset unit 34 about the offset frequencies included in the second sequence information to set the offset frequencies for providing frequency offsets at a plurality of steps every predetermined intervals by using the predetermined carrier frequency provided to the test signal as a reference, with respect to the unit data including the I waveform data and the Q waveform data; and a step of causing a test signal output unit 100 to convert the I waveform analog signal and the Q waveform analog signal which are sequentially output from the pair of digital-to-analog converters 19, 20 into a high-frequency signal by using a carrier frequency signal after carrying out quadrature-modulation to the signals, to be output finally in form of the modulating signal and as a test signal along with frequency offsets at a plurality of steps every predetermined intervals by using the predetermined carrier frequency as a reference.

Specifically, the test signal generating apparatus shown in FIG. 1A is incorporated into a mobile network simulator device for executing a communication test for a communications equipment such as a mobile communication terminal, for example, the mobile telephone described above, to thereby output a modulating signal serving as a test signal to the mobile telephone serving as a test object.

In the test signal generating apparatus for communications equipment according to the first embodiment, with respect to a modulating signal $a_3$ finally output as a test signal from an output terminal 26, frequencies f of five unit data 1a which are sequentially output with time are offset at predetermined frequency intervals up and down (±1 MHz, ±2 MHz) with respect to the reference frequency f0, as shown by the solid lines of FIG. 3B.

Such a modulating signal $a_3$ output as a test signal is, as described by using FIG. 4, used for an interfering wave resistance test for a WCDMA mobile telephone by achieving frequency hopping in which a frequency (a carrier frequency, i.e., the reference frequency f0) of a test signal imitating a GSM signal is made to vary with time.

Namely, the second sequence information including offset frequencies, which are used in the first embodiment, to be stored in the sequence memory 4a which will be described later is set as offset frequencies which enable achieving frequency hopping in which a carrier frequency f of a test signal imitating a GSM signal is made to vary with time. As a result, it is possible to achieve an interfering wave resistance test for a device to be tested in a WCDMA system by the GSM signal in such a manner that the GSM signal discretely moves within a reception range of the device to be tested in the WCDMA system.

In FIG. 1A, in the I waveform memory 2 and the Q waveform memory 3 which configure a pair of waveform memories, there are respectively stored in advance in predetermined storage addresses I component waveform digital data (hereinafter, referred to as I waveform data) and Q component waveform digital data (hereinafter, referred to as Q waveform data) which configure a set of digital baseband quadrature signals I and Q in at least one or more types of unit data 1a serving as the sources of a test signal to be output finally in the form of a modulating signal and with a predetermined carrier frequency f0.

Namely, in the I waveform memory 2, digital I waveform data in the unit data 1a of the modulating signal $a_3$ serving as a test signal which is finally output from the output terminal 26 of the test signal generating apparatus is stored in advance into a read starting address $AD_{1S}$ to a read ending address $AD_{1E}$ corresponding to the predetermined storage addresses, as shown in FIG. 2 which will be described later.

Further, in the Q waveform memory 3, digital Q waveform data in the unit data 1a of the modulating signal $a_3$ serving as a test signal which is finally output from the output terminal 26 of the test signal generating apparatus are stored in advance into a read starting address $AD_{1S}$ to a read ending address $AD_{1E}$ corresponding to the predetermined storage addresses, as shown in FIG. 2 which will be described later.

Then, in FIG. 1A, in the sequence memory 4a, first sequence information and second sequence information are stored as shown in FIG. 2. The first sequence information includes: numbers from 1 to 53 denoting an output order of the respective waveforms included in the modulating signal $a_3$ to be finally output as a test signal; waveform types $1a$ denoting types of the respective waveforms (here, all those are A) from 1 to 5; and read starting addresses $AD_{1S}$ and read ending addresses $AD_{1E}$ in the waveform memories 2 and 3 for reading I waveform data and Q waveform data from the respective waveform memories 2 and 3 for each of the respective waveform types $1a$. The second sequence information includes offset frequencies $\omega'(=2\pi f', \pm 1$ MHz, $\pm 2$ MHz) which are set for providing frequency offsets at a plurality of steps every predetermined intervals by using a predetermined carrier frequency (f) provided to the test signal to be finally output as a reference, with respect to unit data including the I waveform data and the Q waveform data which are read from the waveform memories 2 and 3.

When, in the test signal generating apparatus, at least a band-pass filter 24 is provided as a component having an uneven frequency characteristic in the test signal output unit 100 which will be described later, third sequence information is stored in the sequence memory $4a$. The third sequence information includes level offset values for setting level offset values from a signal level (0 dB) at the predetermined carrier frequency $f_0$ serving as a transmission reference to be greater (+2 dB, +5 dB), as there becomes greater an absolute value of offset frequencies (±1 MHz, ±2 MHz) for providing frequency offsets at a plurality of steps every predetermined intervals by using as a reference a predetermined carrier frequency $f_0$ provided to a test signal as the offset frequencies included in the second sequence information.

Then, the sequence control unit $6a$ which will be described later is configured so as to read the third sequence information from the sequence memory $4a$, and to instruct the pair of multipliers 9 and 10 about the level offset values included in the third sequence information in response to a timing at which I waveform data and Q waveform data are output from the waveform memories 2 and 3, to set level offset values from a signal level (transmission reference level=0 dB) at the predetermined carrier frequency f0 serving as a reference to be greater (+2 dB, +5 dB), as there becomes greater an absolute value of offset frequencies (±1 MHz, ±2 MHz) for providing frequency offsets at a plurality of steps every predetermined intervals by using as a reference a predetermined carrier frequency $f_0$ provided to a test signal as the offset frequencies included in the second sequence information.

Here, with reference to FIG. 3A, description will be given to the reason for that a level set value from the transmission reference level (=0 dB) is set to be greater, as an absolute value of offset frequencies becomes greater.

As described above, when the test signal output unit 100 of the test signal generating apparatus is provided with a plurality of components such as the band-pass filer (BPF) 24, the quadrature modulator 21, the frequency converter 22, and the amplifier 25, whose frequency characteristics are uneven, it is necessary to compensate the total frequency characteristics of the plurality of components in the frequency characteristics of the entire modulating signal $a_3$ composed of five unit data $1a$ whose frequency bandwidths are broadened, serving as a test signal output from the test signal output unit 100.

Namely, as the frequency characteristics shown in FIG. 3A, the signal levels of the unit data $1a$ fall (−2 dB, −5 dB) as those are separated away from the predetermined carrier frequency f0 serving as a reference which will be a center frequency of the test signal. For this reason, in order to compensate for such frequency characteristics, a level offset value is set to be great in advance such that the signal levels of the respective unit data $1a$ are made to be higher (+2 dB, +5 dB) in accordance with offset frequencies $\omega'$ (±1 MHz, ±2 MHz) of the unit data $1a$.

More specifically, as an absolute value of offset frequencies $\omega'$(±1 MHz, ±2 MHz) becomes greater, a level offset value from the transmission reference level 0 dB is set to be greater (+2 dB, +5 dB).

Next, the entire operation of FIG. 1A will be described.

First, the sequence control unit $6a$ reads the first sequence information from the sequence memory $4a$, and instructs the read control unit 7 about numbers from 1 to 5 as a reading order and read (starting, ending) addresses of the unit data including: waveforms A included in a modulating signal $a_3$, which is included in the first sequence information, to be finally output as a test signal; and the I waveform data and the Q waveform data which are stored in the waveform memories 2 and 3 for storing I waveform data and Q waveform data for each of the unit data $1a$ of the waveforms A.

In this manner, the read control unit 7 specifies read starting addresses $AD_{1S}$ and reading ending addresses $AD_{1E}$ of the I waveform data and the Q waveform data in the waveform memories 2 and 3 in order to read the respective unit data $1a$ from 1 to 5 in order from the waveform memories 2 and 3 so as to be synchronous with a clock b from a clock generating unit 5.

At the same time, the sequence control unit $6a$ reads the second sequence information from the sequence memory $4a$, and reads an offset frequency in each of the respective unit data $1a$ based on an offset frequency included in the second sequence information, thereby specifying the read offset frequency to a numerical control oscillator (NCO) 3.

Moreover, the sequence control unit $6a$ reads the third sequence information from the sequence memory $4a$, and sets a level offset value of unit data $1a$ of a corresponding number included in the third sequence information into the multipliers 9 and 10.

Note that, when there is no need to compensate frequency characteristics by level offsets as described above, all the level offset values of the respective unit data $1a$ stored in advance in the sequence memory $4a$ are set to the transmission reference level 0 dB as the predetermined signal level stored in advance in the sequence memory $4a$.

The NCO 33 generates a sine wave sin $\omega(t)$ and a cosine wave cos $\omega(t)$ which correspond to specified offset frequencies $\omega$, and transmits those to the frequency offset unit 34.

The frequency offset unit 34 is provided between the pair of waveform memories 2 and 3 and the pair of multipliers 9 and 10 in a case of FIG. 1A, at the digital stage from the pair of waveform memories 2 and 3 and the pair of digital-to-analog converters 19 and 20. For this reason, as will be described later, the frequency offset unit 34 sets offset frequencies for providing frequency offsets at a plurality of steps every predetermined intervals by using the predetermined carrier frequency of a test signal as a reference, with respect to I waveform data and Q waveform data.

The read control unit 7 reads I waveform data and Q waveform data between the read starting address and the read ending address from the respective waveform memories 2 and 3 based on read starting address and read ending address specified as described above.

In this manner, I waveform data and Q waveform data between the specified read starting address and read ending address specified are sequentially output from the waveform memories 2 and 3.

Then, the I waveform data and the Q waveform data sequentially output from the waveform memories 2 and 3 are input to the frequency offset unit 34.

The frequency offset unit 34 offsets frequencies ω(=2πf) of the I waveform data and Q waveform data sequentially output from the waveform memories 2 and 3 by offset frequencies ω'(=2πf') stored in the sequence memory 4a.

Specifically, when the I waveform data and the Q waveform data are respectively denoted by:

$$\cos \omega(t), \sin \omega(t) \quad (1),$$

these are respectively converted into:

$$\cos\{\omega(t)+\omega'(t)\}, \sin\{\omega(t)+\omega'(t)\} \quad (2).$$

Formula (2) can be expressed by the following formula (3) by using formula (1) and an offset frequency ω:

$$-\sin \omega(t)\cdot\sin \omega'(t)+\cos \omega(t)\cdot\cos \omega'(t)=\cos\{\omega(t)+\omega'(t)\}$$
(First frequency offset)

$$\cos \omega(t)\cdot\sin \omega'(t)+\sin \omega(t)\cdot\cos \omega'(t)=\sin\{\omega(t)+\omega'(t)\} \quad (3)$$
(Second frequency offset)

In order to achieve the frequency offsets represented by the formula (3), the frequency offset unit 34 is composed of, for example, as shown in FIG. 7, first to fourth multipliers 35a, 35b, 35c, and 35d, and first and second adders 36a and 36b.

Namely, the frequency offset unit 34 has: the first and second multipliers 35a and 35d which multiply I waveform data cos ω(t) and Q waveform data sin ω(t) by a first frequency offset component cos ω'(t); the third and fourth multipliers 35c and 35b which multiply I waveform data cos ω(t) and Q waveform data sin ω(t) by a second frequency offset component sin ω'(t); the first adder 36a which adds an output from the first multiplier 35a and an output from the fourth multiplier 35b to thereby output the first frequency offset cos {ω(t)+ω'(t)}=−sin ω(t) sin ω'(t)+cos ω(t)·cos ω'(t); and the second adder 36b which adds an output from the second multiplier 35d and an output from the third multiplier 35c to thereby output the second frequency offset sin $$\{\omega(t)+\omega'(t)\}=-\cos \omega(t)\cdot\sin \omega'(t)+\sin \omega(t)\cdot\cos \omega'(t).$$

In this way, the I waveform data and the Q waveform whose frequencies are offset at the frequency offset unit 34 are respectively input to the respective multipliers 9 and 10.

The respective multipliers 9 and 10 increase the signal levels of the I waveform data and the Q waveform data along with frequency offsets output from the frequency offset unit 34 by an amount of a level offset value (+2 dB of +5 dB) which is set from the sequence control unit 6a as shown by the broken lines in FIG. 3B, in order to set a level offset value from the transmission reference level (0 dB) to be greater as an absolute value of an offset frequency becomes greater as described above.

The I waveform data and the Q waveform data whose levels have been set by the respective multipliers 9 and 10 are input to the pair of digital-to-analog converters 19 and 20, respectively.

The respective digital-to-analog converters 19 and 20 convert the input digital I waveform data and Q waveform data along with frequency offsets into analog I waveform signal and Q waveform signal, and transmits the signals to the quadrature modulator 21 configuring the test signal output unit 100.

The quadrature modulator 21 quadrature-modulates the analog I waveform data and Q waveform data subjected to digital-to-analog conversion by using a local oscillation signal from a local oscillator 21a, into a modulating signal $a_4$ along with frequency offsets to be transmitted to the frequency converter 22.

The frequency converter 22 converts the modulating signal $a_4$ into a high-frequency signal by multiplying the modulating signal $a_4$ along with frequency offsets which is output form the quadrature modulator 21 by a carrier frequency signal from the oscillator 23, and transmits it as a new modulating signal $a_5$ to the band-pass filter (BPF) 24.

Note that a frequency difference (offset frequency ω') among the respective unit data 1a in the modulating signal as, which is converted into a high-frequency signal by multiplying a carrier frequency signal by the frequency converter 22, and is output to the BPF 24, remains as it is as shown in FIG. 6.

FIG. 8 shows a relationship among output times (an output order) of five unit data 1a included in the modulating signal $a_5$ before being input to the BPF 24, offset frequencies ω', and signal levels.

As shown in FIG. 8, the greater absolute value of the offset frequencies ω' the signal has, the greater the signal levels thereof become.

The BPF 24 having frequency characteristics as shown in FIG. 3A eliminates unnecessary frequency components from the modulating signal $a_5$, and transmits it as a new modulating signal $a_6$ to the amplifier 25.

Accordingly, the modulating signal $a_6$ is amplified in the amplifier 25, and output as a final modulating signal $a_3$ (test signal) from the output terminal 26.

In the test signal generating apparatus according to the first embodiment configured in this way, frequencies of a plurality of unit data 1a arranged on the time axis of a modulating signal $a_3$ which is finally output as a test signal from the test signal generating apparatus are offset by the frequency offset unit 34 at the digital stage of I waveform data and Q waveform data.

Therefore, due to this frequency offset, a center frequency of the modulating signal $a_3$ subjected to quadrature-modulation to be converted into a high-frequency signal by a carrier frequency signal varies with time change.

An offset frequency ω' for providing the frequency offsets can be arbitrarily set as one item of the sequence information in the same manner as other conditions into the sequence memory 4a.

Consequently, as described above, it is easily possible to achieve frequency hopping in which a frequency (carrier frequency) of a test signal is randomly changed with time.

Moreover, by level offset, signal levels of the respective unit data 1a are changed by a level offset value corresponding to the frequency characteristic of the BPF 24 at the digital stage of I waveform data and Q waveform data.

Even if the frequencies of the respective unit data 1a in a modulating signal $a_3$ are changed, the frequency characteristics of the entire modulating signal $a_3$ output via the BPF 24 can be maintained to be flat. This makes it possible to improve the signal quantity in the modulating signal $a_3$ to be finally output as a test signal.

Note that, a test database (database) 27 formed in a hard disk drive (HDD) in the test signal generating apparatus is provided with: a waveform database 28 for storing I waveform data and Q waveform data of unit data of a test signal output form the test signal generating apparatus; and a sequence database 29 for storing various sequence information.

The I waveform data and the Q waveform data of the unit data, and various sequence data which are stored in the waveform database 28 and the sequence database 29 are prepared by an external computer 30 such as a PC (personal computer) installed at the outside of the test signal generating apparatus, and downloaded into the waveform database 28 and the sequence database 29 in the test database 27.

Then, when a new test signal is output from the test signal generating apparatus, a test executant operates an operating unit 31 to cause a data writing unit 32 to read I waveform data and Q waveform data corresponding to the new test signal from the waveform database 28, and write these data into the respective waveform memories 2 and 3.

At the same time, the test executant causes it to read sequence information corresponding to the new test signal from the sequence database 29, and write the information into the sequence memory 4a.

When a plurality of test signals whose frequencies are different from one another are output as the new test signals, it suffices to merely write sequence information every frequency of each test signal into the sequence memory 4. Therefore, there is no need to write I waveform data and Q waveform data corresponding to the plurality of test signals whose frequencies are different from one another into the respective waveform memories 2 and 3.

Namely, because a write time for sequence information is extremely shorter as compared with rewrite of I waveform data and Q waveform data, a test operation efficiency can be greatly improved.

SECOND EMBODIMENT

Next, a second embodiment of the test signal generating apparatus for communications equipment according to the present invention will be specifically described with reference to FIGS. 1B, 9 and 10.

Figure 1B:
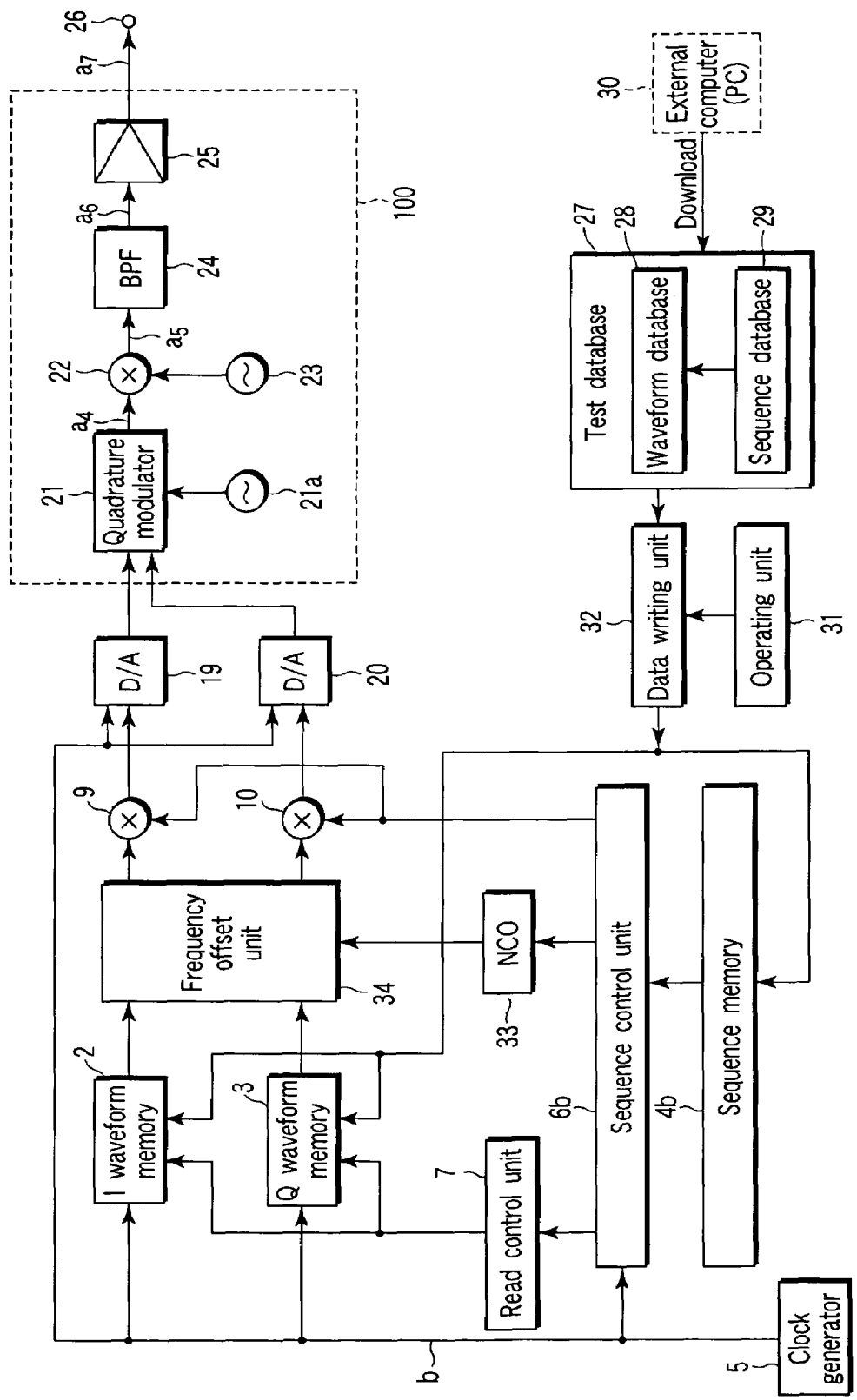
FIG. 1B is a block diagram shown for explaining a schematic configuration of a second embodiment of the test signal generating apparatus for communications equipment according to the invention.

FIG. 1B is a block diagram showing a schematic configuration relating to the test signal generating apparatus for communications equipment according to the second embodiment of the invention.

FIG. 9 is a diagram shown for explaining memory contents in a sequence memory 4b provided in the test signal generating apparatus of FIG. 1B.

Figure 10:
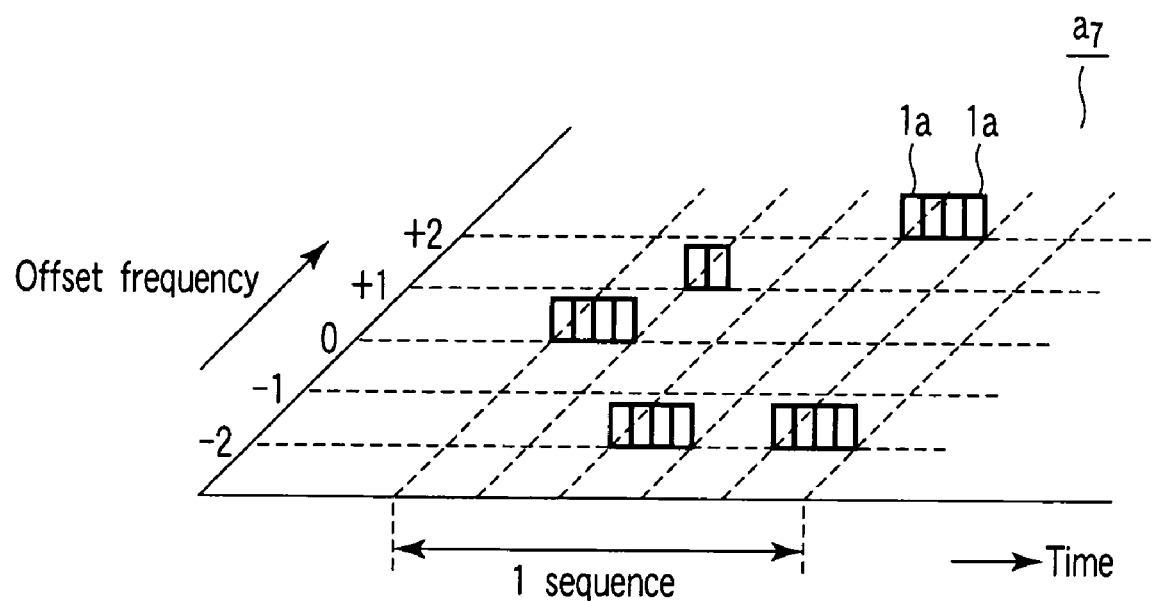
FIG. 10 is a diagram shown for explaining a configuration of a test signal output from the test signal generating apparatus of FIG. 1B.

FIG. 10 is a diagram shown for explaining a configuration of a test signal output from the test signal generating apparatus of FIG. 1B.

In FIG. 1B, the same components as those of the test signal generating apparatus for communications equipment according to the first embodiment shown in FIG. 1A are denoted by the same reference numerals, and detailed descriptions of the overlapped portions will be omitted.

Then, the test signal generating apparatus for communications equipment according to the second embodiment shown in FIG. 1B is different from the test signal generating apparatus for communications equipment according to the first embodiment shown in FIG. 1A in that a sequence memory 4b and a sequence control unit 6b which are respectively different from the sequence memory 4a and the sequence control unit 6a in FIG. 1A are provided.

FIG. 9 is a table shown for explaining memory contents of the sequence memory unit 4b provided in the test signal generating apparatus according to the second embodiment of the invention.

In this sequence memory 4b, in the same manner as the sequence memory 4a in the first embodiment, there is stored first (to third) sequence information including: numbers from 1 to 5 denoting an output order of the respective waveforms included in a modulating signal $a_3$ to be finally output as a test signal; waveform types denoting types of respective waveforms of each of the respective numbers; storage addresses (read starting addresses, read ending addresses) in the respective waveform memories 2 and 3 for reading I waveform data and Q waveform data of each of the respective numbers; and offset frequencies which are set in order to provide frequency offsets at a plurality of steps every predetermined intervals by using a predetermined carrier frequency provided to a test signal to be finally output as a reference, with respect to the unit data including the I waveform data and the Q waveform data read from the respective waveform memories 2 and 3. In addition, second (fourth) sequence information including the number of repetitions of reading I waveform data and Q waveform data in each unit data 1a from the respective waveform memories 2 and 3 for setting the number of repetitions of unit data included in a test signal are stored.

Then, in the test signal generating apparatus for communications equipment according to the second embodiment, sequence information as described above is read from the sequence memory 4b by the sequence control unit 6b. Consequently, in particular, by the second (fourth) sequence information including the number of repetitions of reading I waveform data and Q waveform data in each unit data 1a from the respective waveform memories 2 and 3, a modulating signal $a_7$ as a test signal in which a plurality of unit data 1a having a same offset frequency continue timewise in accordance with the set number of repetitions of reading is to be finally output from the test signal generating apparatus, as shown in FIG. 10.

Namely, in the test signal generating apparatus according to the second embodiment, execution of a frequency offset for each of a plurality of unit data can be easily achieved by setting the execution in advance as the number of repetitions of reading in the sequence memory 4b as sequence information.

The other configurations in the test signal generating apparatus for communications equipment according to the second embodiment are the same as those in the test signal generating apparatus according to the first embodiment described above.

THIRD EMBODIMENT

Next, a third embodiment of the test signal generating apparatus for communications equipment according to the present invention will be concretely described with reference to FIG. 1C.

Figure 1C:
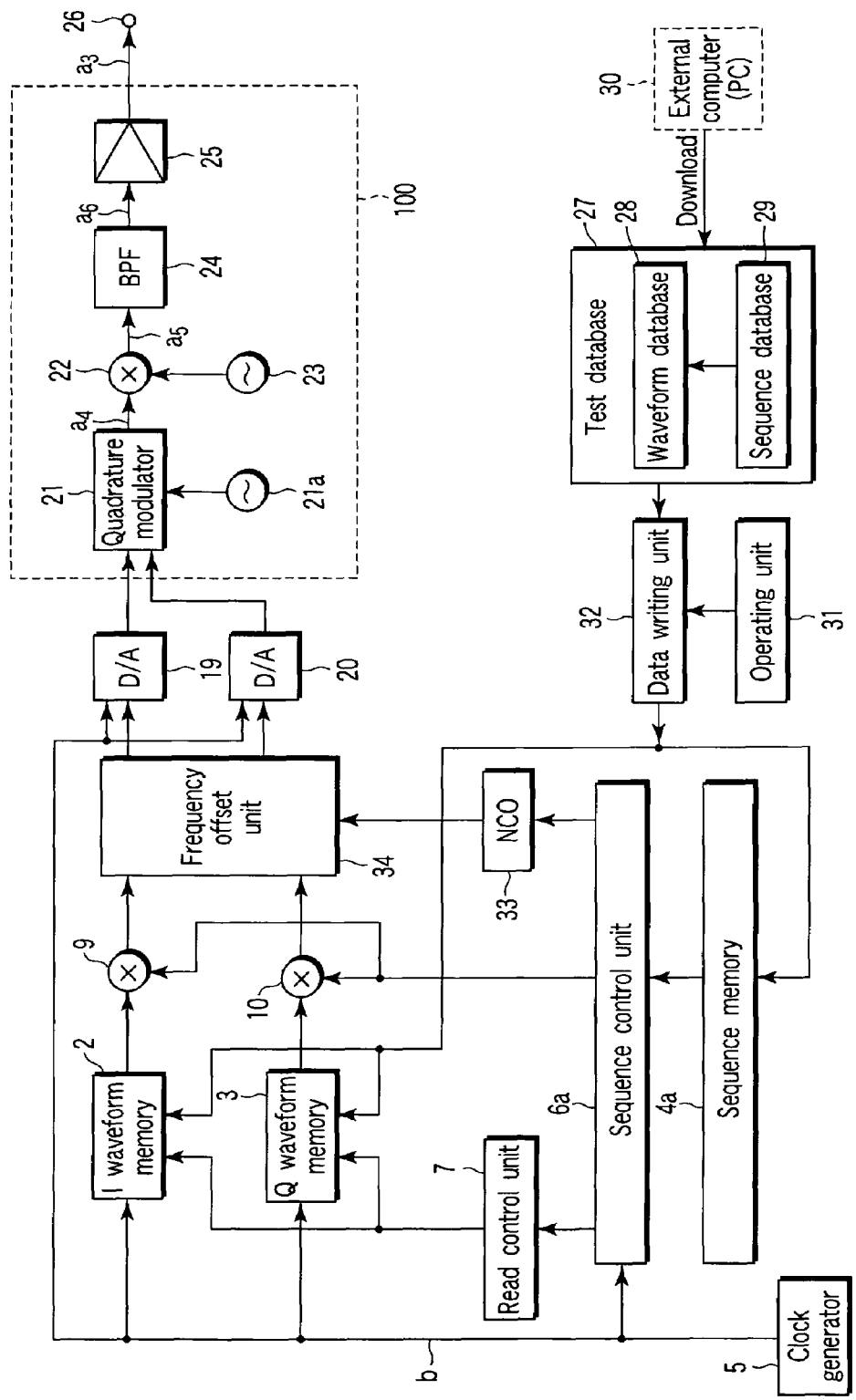
FIG. 1C is a block diagram shown for explaining a schematic configuration of a third embodiment of the test signal generating apparatus for communications equipment according to the invention.

FIG. 1C is a block diagram showing a schematic configuration of the third embodiment relating to the test signal generating apparatus for communications equipment of the present invention.

In FIG. 1C, the same components as those of the test signal generating apparatus for communications equipment according to the first embodiment shown in FIG. 1A are denoted by the same reference numerals, and detailed descriptions of the overlapped portions will be omitted.

Then, the test signal generating apparatus for communications equipment of the third embodiment shown in FIG. 1B is different from the test signal generating apparatus for communications equipment of the first embodiment shown in FIG. 1A in that a frequency offset unit 34 is provided at the digital stage from the pair of waveform memories 2 and 3 up to the pair of digital-to-analog converters 19 and 20, in particular, between the pair of multipliers 9 and 10 and the pair of digital-to-analog converters 19 and 20.

In the same manner as that of the test signal generating apparatus according to the first embodiment, the frequency offset unit 34 sets offset frequencies for providing frequency offsets at a plurality of steps every predetermined intervals by using the predetermined carrier frequency of a test signal as a reference, with respect to I waveform data and Q waveform data.

In FIG. 1C, the sequence memory 4a and the sequence control unit 6a same as those in FIG. 1A are provided, and the numerical control oscillator (NCO) 33 is provided between the frequency offset unit 34 and the sequence control unit 6a.

Accordingly, in the test signal generating apparatus for communications equipment according to the third embodiment, with respect to a modulating signal $a_3$ to be finally output as a test signal from the output terminal 26, frequencies f of five unit data 1a which are sequentially output with time are offset at predetermined steps up or down with respect to the reference frequency f0 as shown by solid lines of FIG. 3B, in the same manner as in the test signal generating apparatus according to the first embodiment.

In this case, the I waveform data and the Q waveform data sequentially output from the respective waveform memories 2 and 3 are not directly input to the frequency offset unit 34 unlike the test signal generating apparatus according to the first embodiment, but input to the frequency offset unit 34 after signal levels for level offsets are respectively set via the respective multipliers 9 and 10.

The other configurations in the test signal generating apparatus for communications equipment according to the third embodiment are the same as those in the test signal generating apparatus according to the second embodiment described above.

FOURTH EMBODIMENT

Next, a fourth embodiment of the test signal generating apparatus for communications equipment according to the present invention will be concretely described with reference to FIG. 1D.

Figure 1D:
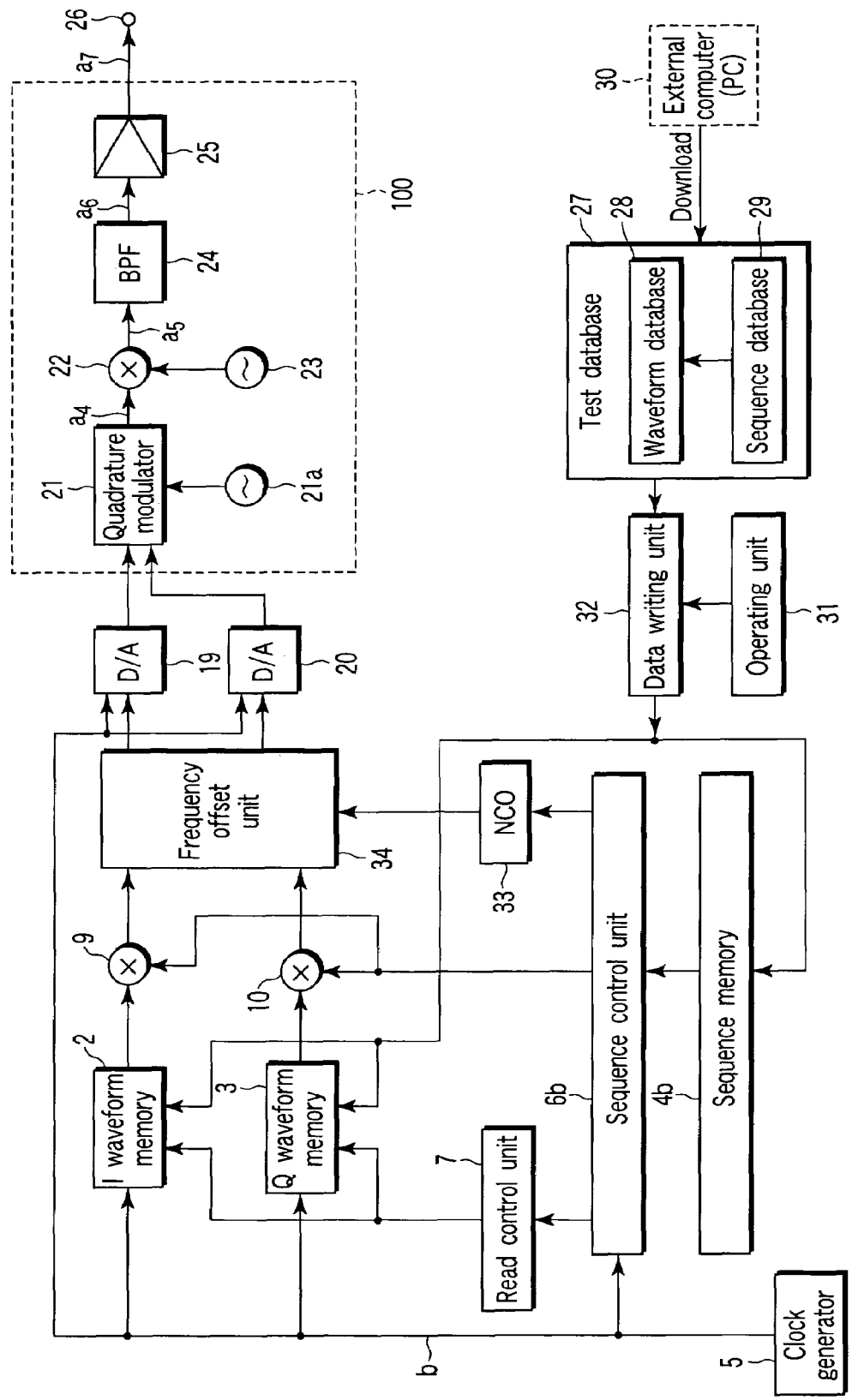
FIG. 1D is a block diagram shown for explaining a schematic configuration of a fourth embodiment of the test signal generating apparatus for communications equipment according to the invention.

FIG. 1D is a block diagram showing a schematic configuration relating to the test signal generating apparatus for communications equipment according to the fourth embodiment of the invention.

In FIG. 1D, the same components as those of the test signal generating apparatus for communications equipment according to the third embodiment shown in FIG. 1C are denoted by the same reference numerals, and detailed descriptions of the overlapped portions will be omitted.

Then, the test signal generating apparatus for communications equipment according to the fourth embodiment shown in FIG. 1D is different from the test signal generating apparatus for communications equipment according to the third embodiment shown in FIG. 1C in that a sequence memory 4b and a sequence control unit 6b which are respectively different from the sequence memory 4a and the sequence control unit 6a in FIG. 1C are provided.

Accordingly, in the test signal generating apparatus for communications equipment according to the fourth embodiment, in the same manner as in the test signal generating apparatus for communications equipment according to the second embodiment, a modulating signal a7 as a test signal in which a plurality of unit data 1a having a same offset frequency timewise continue is to be finally output.

In the test signal generating apparatus for communications equipment according to the fourth embodiment shown in FIG. 1D, in the same manner as in the test signal generating apparatus for communications equipment according to the third embodiment shown in FIG. 1C, there is provided a frequency offset unit 34 inserted at the digital stage from the pair of waveform memories 2 and 3 up to the pair of digital-to-analog converters 19 and 20, in particular, between the pair of multipliers 9 and 10 and the pair of digital-to-analog converters 19 and 20.

As in the same as that of the test signal generating apparatus according to the third embodiment described above, the frequency offset unit 34 sets offset frequencies for providing frequency offsets at a plurality of steps every predetermined intervals by using the predetermined carrier frequency of a test signal as a reference, with respect to I waveform data and Q waveform data.

In FIG. 1D, the numerical control oscillator (NCO) 33 is provided between the frequency offset unit 34 and the sequence control unit 6a, in the same manner as in FIG. 1C.

In this case, the I waveform data and the Q waveform data sequentially output from the respective waveform memories 2 and 3 are not directly input to the frequency offset unit 34 unlike the test signal generating apparatus according to the first embodiment, but input to the frequency offset unit 34 after signal levels for level offsets are respectively set via the respective multipliers 9 and 10.

The other configurations in the test signal generating apparatus for communications equipment according to the fourth embodiment are the same as those in the test signal generating apparatus according to the second embodiment.

As described above in detail, according to the present invention, it is possible to provide, in order to solve the problems in the prior art, a test signal generating apparatus for communications equipment and a test signal generating method for communications equipment which can keep a required memory capacity of a memory device to a minimum, and can greatly reduce an operation of generating signal waveforms of test signals, and can handle even when same data is repeatedly used several times while insuring a high-level accuracy in each hopping frequency.

The invention claimed is:

1. A test signal generating apparatus for communications equipment, comprising:

a pair of waveform memories in which I component waveform digital data (hereinafter, referred to as I waveform data) and Q component waveform digital data (hereinafter, referred to as Q waveform data) which configure a set of digital baseband quadrature signals I and Q in at least one or more types of unit data serving as sources of a test signal to be finally output, are respectively stored in advance at predetermined addresses;

a read control unit to sequentially output the I waveform data and the Q waveform data from the pair of waveform memories;

a pair of multipliers to set signal levels of the I waveform data and the Q waveform data which are sequentially output from the pair of waveform memories to desired signal levels, respectively;

a pair of digital-to-analog converters which convert the I waveform data and the Q waveform data which are sequentially output from the pair of multipliers into an I waveform analog signal and a Q waveform analog signal, respectively;

a frequency offset unit which sets offset frequencies for providing frequency offsets at a plurality of steps at predetermined intervals by using a predetermined carrier frequency provided to the test signal as a reference, with respect to the I waveform data and the Q waveform data between the pair of waveform memories and the pair of digital-to-analog converters;

a sequence memory which stores in advance: (i) first sequence information including a reading order and read addresses of the unit data including the I waveform data and the Q waveform data stored in the pair of waveform memories, and the desired signal levels to be set in the unit data including the I waveform data and the Q waveform data read from the pair of waveform memories; and
(ii) second sequence information including the offset frequencies set for providing frequency offsets at a plurality of steps at predetermined intervals by using the predetermined carrier frequency provided to the test signal as a reference, with respect to the unit data including the I waveform data and the Q waveform data read from the pair of waveform memories;

a sequence control unit which (i) reads the first sequence information from the sequence memory, instructs the read control unit about the reading order and the read addresses included in the first sequence information, thereby causing the read control unit to sequentially output the I waveform data and the Q waveform data from the pair of waveform memories, and instructs the pair of multipliers about the desired signal levels included in the first sequence information in response to a timing at which the I waveform data and the Q waveform data are output from the pair of waveform memories, thereby causing the pair of multipliers to set signal levels of the I waveform data and the Q waveform data which are sequentially output from the pair of waveform memories respectively to the desired signal levels; and (ii) reads the second sequence information from the sequence memory, and instructs the frequency offset unit about the offset frequencies included in the second sequence information, thereby causing the frequency offset unit to set the offset frequencies for providing frequency offsets at a plurality of steps at predetermined intervals by using the predetermined carrier frequency provided to the test signal as a reference, with respect to the unit data including the I waveform data and the Q waveform data; and a test signal output unit which converts the I waveform analog signal and the Q waveform analog signal which are sequentially output from the pair of digital-to-analog converters into a high-frequency signal by using a carrier frequency signal after carrying out quadrature modulation to the signals, thereby causing the high-frequency signal to be output finally in the form of the modulating signal and as a test signal along with frequency offsets at a plurality of steps at predetermined intervals by using the predetermined frequency as a reference.

2. The test signal generating apparatus for communications equipment according to claim 1, wherein the frequency offset unit is provided between the pair of waveform memories and the pair of multipliers.

3. The test signal generating apparatus for communications equipment according to claim 1, wherein the frequency offset unit is provided between the pair of multipliers and the pair of digital-to-analog converters.

4. The test signal generating apparatus for communications equipment according to claim 1, wherein the test signal output unit comprises:

a quadrature modulator which quadrature-modulates the I waveform analog signal and the Q waveform analog signal which are sequentially output from the pair of digital-to-analog converters by using a local oscillation signal from a local oscillator, to output a modulating signal;

a frequency converter which converts the modulating signal output from the quadrature modulator into a high-frequency signal by using a carrier frequency signal from an oscillator, to output a signal in the form of the modulating signal and as a test signal along with a predetermined carrier frequency; and a band-pass filter which eliminates unnecessary frequency components included in the test signal output from the frequency converter, thereby causing the test signal to be output finally in the form of the modulating signal and as a test signal along with offset frequencies at a plurality of steps at predetermined intervals by using the predetermined carrier frequency as a reference.

5. The test signal generating apparatus for communications equipment according to claim 4, wherein:

when at least the band-pass filter is provided as a component having an uneven frequency characteristic to the test signal output unit, the sequence memory stores in advance third sequence information including level offset values for setting level offset values from a signal level at the predetermined carrier frequency serving as the reference to be greater, as there becomes greater an absolute value of offset frequencies for providing frequency offsets at a plurality of steps at predetermined intervals by using as a reference the predetermined carrier frequency provided to the test signal as the offset frequencies included in the second sequence information, and the sequence control unit reads the third sequence information from the sequence memory, and instructs the pair of multipliers about the level offset values included in the third sequence information in response to a timing at which the I waveform data and the Q waveform data are output from the pair of waveform memories, thereby causing the multipliers to set level offset values from a signal level at the predetermined carrier frequency serving as the reference to be greater, as there becomes greater an absolute value of offset frequencies for providing frequency offsets at a plurality of steps at predetermined intervals by using as a reference the predetermined carrier frequency provided to the test signal as the offset frequency information included in the second sequence information.

6. The test signal generating apparatus for communications equipment according to claim 1, wherein:

the sequence memory stores in advance fourth sequence information including a number of repetitions of reading I waveform data and Q waveform data for each of the unit data from the pair of waveform memories in order to set a number of repetitions for each of the unit data included in the test signal to be finally output, and the sequence control unit reads the fourth sequence information from the sequence memory, and instructs the read control unit about the number of repetitions of reading I waveform data and Q waveform data for each of the unit data included in the fourth sequence information from the pair of waveform memories in response to a timing at which the I waveform data and the Q waveform data are output from the pair of waveform memories, thereby causing the read control unit to sequentially output from the pair of waveform memories the unit data continuously the number of times corresponding to the number of repetitions of reading I waveform data and Q waveform data for each of the unit data from the pair of waveform memories.

7. The test signal generating apparatus for communications equipment according to claim 1, wherein the second sequence information including offset frequencies to be stored in the sequence memory is set as offset frequencies which enable achievement of frequency hopping which enables achieving a carrier frequency of a test signal imitating a Global System for Mobile Communication (GSM) signal as the test signal is made to vary with time, whereby it is possible to achieve an interfering wave resistance test for a device to be tested in a Wideband Code Division Multiple Access (WCDMA) system by means of the GSM signal in such a manner that the GSM signal discretely moves within a range of received frequencies of the device to be tested in the WCDMA system.

8. The test signal generating apparatus for communications equipment according to claim 1, wherein the pair of multipliers multiply the I waveform data and the Q waveform data output from the pair of waveform memories by a gain multiplication value determined based on the signal levels instructed by the sequence control unit, thereby setting signal levels of the I waveform data and the Q waveform data output from the pair of waveform memories to the signal levels included in the first sequence information which is stored in the sequence memory.

9. The test signal generating apparatus for communications equipment according to claim 5, wherein the pair of multipliers multiply the I waveform data and the Q waveform data output from the pair of waveform memories by a gain multiplication value determined based on the level offset values included in the third sequence information, the level offset values being instructed by the sequence control unit, thereby setting signal levels of the I waveform data and the Q waveform data read from the pair of waveform memories to the level offset values included in the third sequence information which is stored in the sequence memory.

10. The test signal generating apparatus for communications equipment according to claim 1, further comprising:
   a test database formed in a hard disk drive having provided therein a waveform database which stores I waveform data and Q waveform data of the unit data included in the test signal and a sequence database which stores various sequence information; and
   a data writing unit connected to the test database,
   wherein:
      the I waveform digital data and the Q waveform digital data stored in the waveform database, and the various sequence information stored in the sequence database are prepared outside, and downloaded into the test database, and
      I waveform digital data and Q waveform digital data corresponding to a test signal to be newly output are read from the waveform database via the data writing unit and written into the pair of waveform memories, and at the same time, sequence information corresponding to the test signal to be newly output is read from the sequence database and written into the sequence memory.

11. The test signal generating apparatus for communications equipment according to claim 1, further comprising:
   a numerical control oscillator which causes the sequence control unit to specify, as the offset frequencies included in the second sequence information read from the sequence memory, offset frequencies ($\omega'$) for providing frequency offsets at a plurality of steps at predetermined intervals by using the predetermined carrier frequency provided to the test signal as a reference,
   wherein:
      the numerical control oscillator generates a sine wave $\sin \omega'(t)$ and a cosine wave $\cos \omega'(t)$ which correspond to the offset frequencies ($\omega'$) specified by the sequence control unit, and transmits the sine wave $\sin \omega'(t)$ and the cosine wave $\cos \omega'(t)$ to the frequency offset unit, and
      when frequencies $\omega$ (=2Πf) of the I waveform data and the Q waveform data are offset by offset frequencies $\omega'$ (=2Πf') stored in the sequence memory, the frequency offset unit carries out frequency offset processing in such a manner that, when the I waveform data and the Q waveform data are respectively denoted by:

$$\cos \omega(t), \sin \omega(t),$$

the sine wave and cosine wave are converted respectively into:

$$\cos \{\omega(t)+\omega'(t)\}, \sin \{\omega(t)+\omega'(t)\}.$$

12. The test signal generating apparatus for communications equipment according to claim 11, wherein the frequency offset unit converts the I waveform data $\cos \omega(t)$ and the Q waveform data $\sin \omega(t)$ respectively into $\cos \{\omega(t)+\omega'(t)\}$, $\sin \{\omega(t)+\omega'(t)\}$ using the relationships:

$$\cos \{\omega(t)+\omega'(t)\}=-\sin \omega(t)\cdot\sin \omega'(t)+\cos \omega(t)\cdot\cos \omega'(t),$$
   and
   $$\sin \{\omega(t)+\omega'(t)\}=\cos \omega(t)\cdot\sin \omega'(t)+\sin \omega(t)\cdot\cos \omega'(t).$$

13. The test signal generating apparatus for communications equipment according to claim 12, wherein the frequency offset unit comprises:
   first and second multipliers which multiply the I waveform data $\cos \omega(t)$ and the Q waveform data $\sin \omega(t)$ respectively by a first frequency offset component $\cos \omega'(t)$;
   third and fourth multipliers which multiply the I waveform data $\cos \omega(t)$ and the Q waveform data $\sin \omega(t)$ respectively by a second frequency offset component $\sin \omega'(t)$;
   a first adder which outputs the first frequency offset $\cos \{\omega(t)+\omega'(t)\}=-\sin \omega(t) \cap \sin \omega'(t) +\cos \omega'(t) \cdot\cos \omega'(t)$ by adding an output from the first multiplier and an output from the fourth multiplier; and
   a second adder which outputs the second frequency offset $\sin \{\omega(t)+\omega'(t)\}=-\cos \omega(t) \cap \sin \omega'(t) +\sin \omega'(t) \cdot\cos \omega'(t)$ by adding an output from the second multiplier and an output from the third multiplier.

14. A test signal generating method for communications equipment, comprising:
   respectively storing in advance I component waveform digital data (hereinafter, referred to as I waveform data) and Q component waveform digital data (hereinafter, referred to as Q waveform data) which configure a set of digital baseband quadrature signals I and Q in at least one or more types of unit data serving as sources of a test signal to be finally output, at predetermined addresses of a pair of waveform memories;
   causing a sequence memory to store in advance (i) first sequence information including a reading order and read addresses of the unit data including the I waveform data and the Q waveform data stored in the pair of waveform memories, and desired signal levels to be set in the unit data including the I waveform data and the Q waveform data read from the pair of waveform memories, and (ii) second sequence information including offset frequencies which are set for providing frequency offsets at a plurality of steps at predetermined intervals by using a predetermined carrier frequency provided to the test signal as a reference, with respect to the unit data including the I waveform data and the Q waveform data read from the pair of waveform memories;
   causing a sequence control unit to read the first sequence information from the sequence memory, and instruct a read control unit about the reading order and the read addresses included in the first sequence information to sequentially output the I waveform data and the Q waveform data from the pair of waveform memories;

causing the sequence control unit to read the first sequence information from the sequence memory, and instruct a pair of multipliers about the desired signal levels included in the first sequence information in response to a timing at which the I waveform data and the Q waveform data are output from the pair of waveform memories, thereby respectively setting signal levels of the I waveform data and the Q waveform data which are sequentially output from the pair of waveform memories to the desired signal levels;

causing a pair of digital-to-analog converters to respectively convert the I waveform data and the Q waveform data which are sequentially output from the pair of multipliers into an I waveform analog signal and a Q waveform analog signal;

at a digital stage from the pair of waveform memories up to the pair of digital-to-analog converters, causing the sequence control unit to read the second sequence information from the sequence memory, and instruct a frequency offset unit about the offset frequencies included in the second sequence information to set the offset frequencies for providing frequency offsets at a plurality of steps at predetermined intervals by using the predetermined carrier frequency provided to the test signal as a reference, with respect to the unit data including the I waveform data and the Q waveform data; and causing a test signal output unit to convert the I waveform analog signal and the Q waveform analog signal which are sequentially output from the pair of digital-to-analog converters into a high-frequency signal by using a carrier frequency signal after carrying out quadrature-modulation to the signals, to output a signal finally in the form of the modulating signal and as a test signal along with frequency offsets at a plurality of steps at predetermined intervals by using the predetermined carrier frequency as a reference.

15. The test signal generating method for communications equipment according to claim 14, wherein setting the frequency offsets is carried out in a frequency offset unit provided between the pair of waveform memories and the pair of multipliers.

16. The test signal generating method for communications equipment according to claim 14, wherein setting the offset frequency information is carried out in a frequency offset unit provided between the pair of multipliers and the pair of digital-to-analog converters.

17. The test signal generating method for communications equipment according to claim 14, wherein outputting the I waveform analog signal and the Q waveform analog signal finally in form of the modulating signal and as a test signal along with frequency offsets at a plurality of steps at predetermined intervals by using the predetermined frequency as a reference comprises:

causing a quadrature modulator to output the I waveform analog signal and the Q waveform analog signal which are sequentially output from the pair of digital-to-analog converters, as a modulating signal quadrature-modulated by using a local oscillation signal from a local oscillator;

causing a frequency converter to convert the modulating signal output from the quadrature modulator into a high-frequency signal by using a carrier frequency signal from an oscillator, to output a signal in the form of the modulating signal and as a test signal along with the predetermined carrier frequency; and causing a band-pass filter to eliminate unnecessary frequency components included in a test signal output from the frequency converter, to output a signal finally in the form of the modulating signal and as a test signal along with frequency offsets at a plurality of steps at predetermined intervals by using the predetermined carrier frequency as a reference.

18. The test signal generating method for communications equipment according to claim 17, further comprising:

when at least the band-pass filter is provided as a component having an uneven frequency characteristic to the test signal output unit, causing the sequence memory to store in advance third sequence information which includes level offset values for setting level offset values from a signal level at the predetermined carrier frequency serving as the reference to be greater, as there becomes greater an absolute value of offset frequencies for providing frequency offsets at a plurality of steps at predetermined intervals by using as a reference the predetermined carrier frequency provided to the test signal as the offset frequencies included in the second sequence information; and causing the sequence control unit to read the third sequence information from the sequence memory, and instruct the pair of multipliers about the level offset values included in the third sequence information in response to a timing at which the I waveform data and the Q waveform data are output from the pair of waveform memories, thereby setting level offset values from a signal level at the predetermined carrier frequency serving as the reference to be greater, as there becomes greater an absolute value of offset frequencies for providing frequency offsets at a plurality of steps at predetermined intervals by using as a reference the predetermined carrier frequency provided to the test signal as the offset frequencies included in the second sequence information.

19. The test signal generating method for communications equipment according to claim 14, further comprising:

causing the sequence memory to store in advance fourth sequence information including a number of repetitions of reading I waveform data and Q waveform data for each of the unit data from the pair of waveform memories in order to set a number of repetitions for each of the unit data included in the test signal to be finally output; and causing the sequence control unit to read the fourth sequence information from the sequence memory, and instruct the read control unit about the number of repetitions of reading I waveform data and Q waveform data for each of the unit data included in the fourth sequence information from the pair of waveform memories in response to a timing at which the I waveform data and the Q waveform data are output from the pair of waveform memories, thereby sequentially outputting from the pair of waveform memories the unit data continuously the number of times corresponding to the number of repetitions of reading I waveform data and Q waveform data for each of the unit data from the pair of waveform memories.

20. The test signal generating method for communications equipment according to claim 14, wherein, in causing the sequence memory to store in advance the second sequence information including the offset frequencies, the second sequence information including the offset frequencies to be stored in the sequence memory is set as offset frequencies which enable achievement of frequency hopping which enables achieving a carrier frequency of a test signal imitating a Global System for Mobile Communication (GSM) signal as the test signal is made to vary with time, whereby it is possible to achieve an interfering wave resistance test for a device to be tested in a Wideband Code Division Multiple Access (WCDMA) system by the GSM signal in such a manner that the GSM signal discretely moves within a range of received frequencies of the device to be tested in the WCDMA system.

21. The test signal generating method for communications equipment according to claim 14, wherein setting signal levels of the I waveform data and the Q waveform data which are sequentially output from the pair of waveform memories to desired signal levels respectively comprises using the pair of multipliers to multiply the I waveform data and the Q waveform data output from the pair of waveform memories by a gain multiplication value determined based on the signal levels instructed by the sequence control unit, whereby signal levels of the I waveform data and the Q waveform data read from the pair of waveform memories are set to the signal levels included in the first sequence information stored in the sequence memory.

22. The test signal generating method for communications equipment according to claim 18, wherein setting signal levels of the I waveform data and the Q waveform data which are sequentially output from the pair of waveform memories to desired signal levels respectively comprises using the pair of multipliers to multiply the I waveform data and the Q waveform data output from the pair of waveform memories by a gain multiplication value determined based on the level offset values included in the third sequence information, which are instructed by the sequence control unit, whereby signal levels of the I waveform data and the Q waveform data read from the pair of waveform memories are set to the level offset values included in the third sequence information stored in the sequence memory.

23. The test signal generating method for communications equipment according to claim 14, further comprising:
    preparing: a test database formed in a hard disk drive having provided therein a waveform database which stores the I waveform data and the Q waveform data of the unit data included in the test signal and a sequence database which stores various sequence information; and a data writing unit connected to the test database;
    downloading into the test database the I waveform data and the Q waveform data which are prepared outside to be stored in the waveform database, and the various sequence information stored in the sequence database; and
    causing the data writing unit to read from the waveform database the I waveform data and the Q waveform data corresponding to a test signal to be newly output to be written into the pair of waveform memories, and to read sequence information corresponding to the test signal to be newly output from the sequence database to be written into the sequence memory.

24. The test signal generating method for communications equipment according to claim 14, wherein setting the offset frequencies comprises:

causing a numerical control oscillator to specify offset frequencies ($\omega'$) for providing frequency offsets at a plurality of steps at predetermined intervals by using as a reference the predetermined carrier frequency of the test signal, as the offset frequencies included in the second sequence information read from the sequence memory;

causing the numerical control oscillator to generate a sine wave $\sin \omega'(t)$ and a cosine wave $\cos \omega(t)$, which correspond to the offset frequencies ($\omega'$) specified by the sequence control unit, to be transmitted to the frequency offset unit; and when frequencies $\omega$ ($=2\Pi f$) of the I waveform data and the Q waveform data are offset by offset frequencies $\omega'$ ($=2\Pi f'$) stored in the sequence memory, causing the frequency offset unit to carry out frequency offset processing in such a manner that, when the I waveform data and the Q waveform data are respectively denoted by:

$\cos \omega(t), \sin \omega(t),$ the sine wave and cosine wave are converted respectively into:

$\cos \{\omega(t)=\omega'(t)\}, \sin \{\omega(t)+\omega'(t)\}.$

25. The test signal generating method for communications equipment according to claim 24, wherein the frequency offset unit converts the I waveform data $\cos \omega(t)$ and the Q waveform data $\sin \omega(t)$ respectively into $\cos \{\omega(t)+\omega'(t)\}$, $\sin \{\omega(t)+\omega'(t)\}$ using the relationships:

$\cos \{\omega(t)+\omega'(t)\} = -\sin \omega(t) \cdot \sin \omega'(t) + \cos \omega(t) \cdot \cos \omega'(t),$
and $\sin \{\omega(t)+\omega'(t)\} = \cos \omega(t) \cdot \sin \omega'(t) + \sin \omega(t) \cdot \cos \omega'(t).$ 26. The test signal generating method for communications equipment according to claim 25, causing the frequency offset unit to carry out frequency offset processing comprises:

causing first and second multipliers to multiply the I waveform data $\cos \omega(t)$ and the Q waveform data $\sin \omega(t)$ respectively by a first frequency offset component $\cos \omega'(t)$;

causing third and fourth multipliers to multiply the I waveform data $\cos \omega(t)$ and the Q waveform data $\sin \omega(t)$ by a second frequency offset component $\sin \omega(t)$;

causing a first adder to add an output from the first multiplier and an output from the fourth multiplier, thereby outputting the first frequency offset $\cos \{\omega(t)+\omega'(t)\} = -\sin \omega(t) \cdot \sin \omega'(t) + \cos \omega(t) \cdot \cos \omega'(t)$; and causing a second adder to add an output from the second multiplier and an output from the third multiplier, thereby outputting the second frequency offset $\sin \{\omega(t)+\omega'(t)\} = -\cos \omega(t) \cdot \sin \omega'(t) + \sin \omega(t) \cdot \cos \omega'(t).$

* * * * *

UNITED STATES PATENT AND TRADEMARK OFFICE
CERTIFICATE OF CORRECTION

PATENT NO. : 7,668,234 B2  Page 1 of 1
APPLICATION NO. : 11/579644
DATED : February 23, 2010
INVENTOR(S) : Akihisa Kumaki It is certified that error appears in the above-identified patent and that said Letters Patent is hereby corrected as shown below:

On the Title Page:

Under Item (86) PCT No.;

change "PCT/JP2006/007355" to --PCT/JP2006/307355--.

Signed and Sealed this

Seventeenth Day of August, 2010

David J. Kappos
*Director of the United States Patent and Trademark Office*